United States Patent
Kinney, Jr. et al.

[11] Patent Number: 5,944,094
[45] Date of Patent: Aug. 31, 1999

[54] DRY-AIR-SURFACE HEAT EXCHANGER

[75] Inventors: Ohler L. Kinney, Jr., Leawood, Kans.; Glenn S. Brenneke, Lee's Summit, Mo.; Thomas W. Bugler, III, Prairie Village, Kans.

[73] Assignee: The Marley Cooling Tower Company, Overland Park, Kans.

[21] Appl. No.: 08/917,390

[22] Filed: Aug. 25, 1997

Related U.S. Application Data

[63] Continuation-in-part of application No. 08/705,635, Aug. 30, 1996, abandoned.

[51] Int. Cl.⁶ ........................................... F28F 3/00
[52] U.S. Cl. .......................... 165/166; 165/900; 165/177; 165/167; 261/DIG. 11
[58] Field of Search ................................ 165/900, 179, 165/177, 170, 167, 166, 124, 110; 261/DIG. 11, DIG. 77

[56] References Cited

U.S. PATENT DOCUMENTS

| | | | |
|---|---|---|---|
| 1,502,573 | 7/1924 | Kuhn | 261/DIG. 11 X |
| 1,905,422 | 4/1933 | Rasmussen | 261/DIG. 11 X |
| 3,540,702 | 11/1970 | Uyama | 261/DIG. 11 X |
| 3,733,063 | 5/1973 | Loetel et al. | 261/DIG. 11 X |
| 3,885,936 | 5/1975 | Limebeer | 261/DIG. 11 X |
| 3,995,689 | 12/1976 | Cates | 165/166 |
| 4,052,491 | 10/1977 | Lefevre | 261/DIG. 11 X |
| 4,313,494 | 2/1982 | Bengtsson | 165/166 X |
| 4,320,073 | 3/1982 | Bugler, III et al. | 261/DIG. 11 X |
| 4,344,899 | 8/1982 | Monjoie | 261/DIG. 11 X |
| 4,361,426 | 11/1982 | Carter et al. | 261/DIG. 11 X |
| 4,374,542 | 2/1983 | Bradley | 261/DIG. 11 X |
| 4,518,544 | 5/1985 | Carter et al. | 261/DIG. 11 X |
| 4,548,766 | 10/1985 | Kinney, Jr. et al. | 261/DIG. 11 X |
| 4,579,692 | 4/1986 | Bugler, III et al. | 261/DIG. 11 X |
| 4,874,035 | 10/1989 | Kashiwada et al. | 165/900 X |
| 4,893,669 | 1/1990 | Kashiwada et al. | 165/900 X |

FOREIGN PATENT DOCUMENTS 0154985  6/1990  Japan ............................ 261/DIG. 77

*Primary Examiner*—Christopher Atkinson
*Attorney, Agent, or Firm*—Hovey, Williams, Timmons & Collins

[57] ABSTRACT

A dry-air-surface heat exchanger is provided for use in a liquid cooling tower, and includes a plurality of preformed, shape-retaining heat transfer members of relatively thin synthetic resin sheet material. Each member presents a pair of upright, side-by-side panels that are preferably folded together about a vertical axis to present inward-facing wet-transfer surfaces adapted to transfer heat between the fluid and the member, and an outward-facing dry-transfer surface adapted to transfer heat between the member and air. The folded member is configured to present a series of tortuous liquid flow paths between the panels extending between the upper and lower edges, and the side edges are secured together in substantially fluid tight sealing engagement. A plurality of the folded members are provided in a pack, and a diffuser is positioned adjacent to the upper edges of the folded members for receiving hot liquid and directing the hot liquid between the panels of each member. The diffuser seats against the upper edges to substantially uniformly distribute the fluid to be cooled into the fluid passages while keeping the air passages therebetween free of fluid. The ratio of the total vertical, cross-sectional area of the liquid passages through the heat transfer members with respect to the total vertical, cross-sectional area of the air passages between the heat transfer members is from about 0.67 to about 1.5.

39 Claims, 12 Drawing Sheets

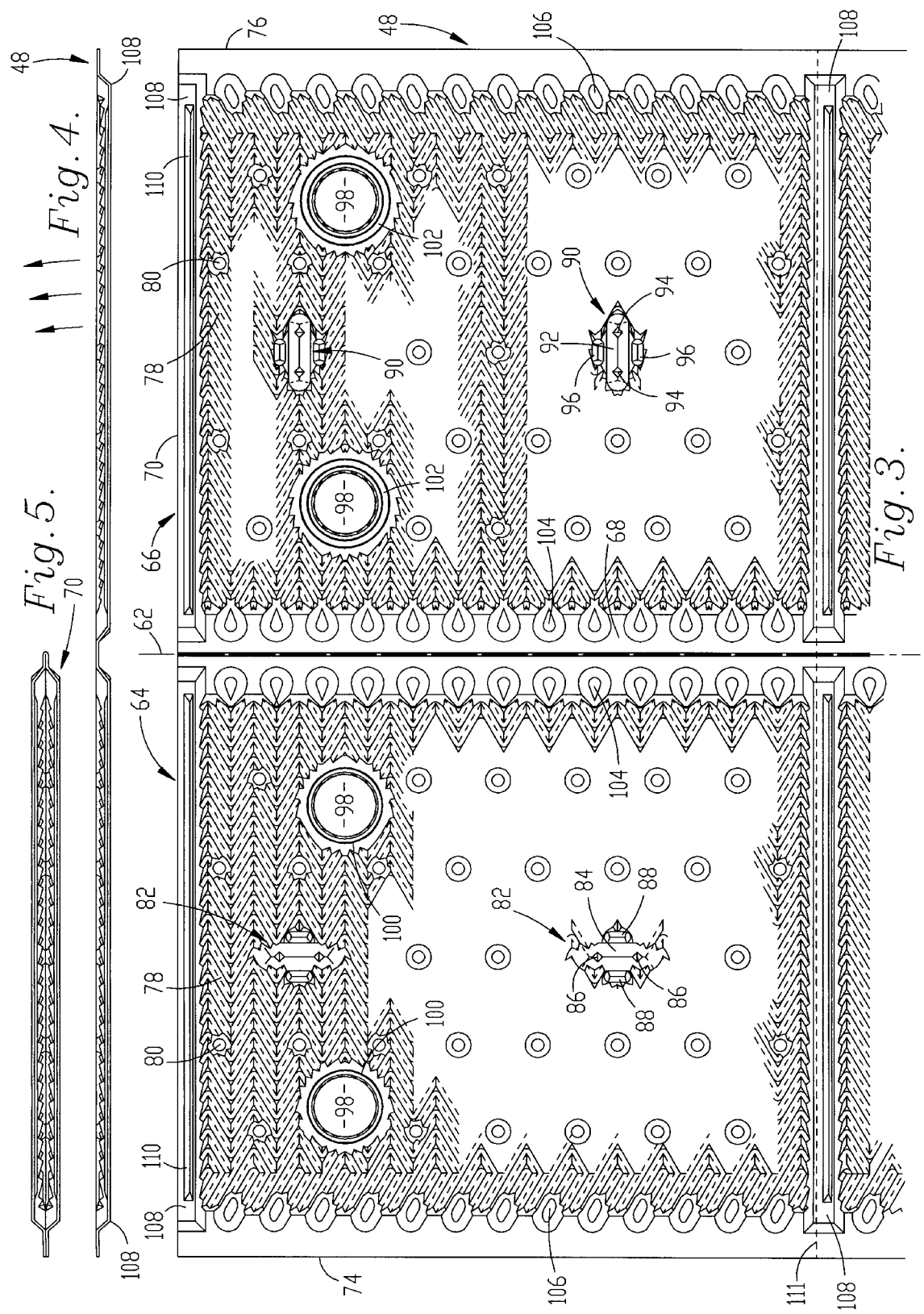

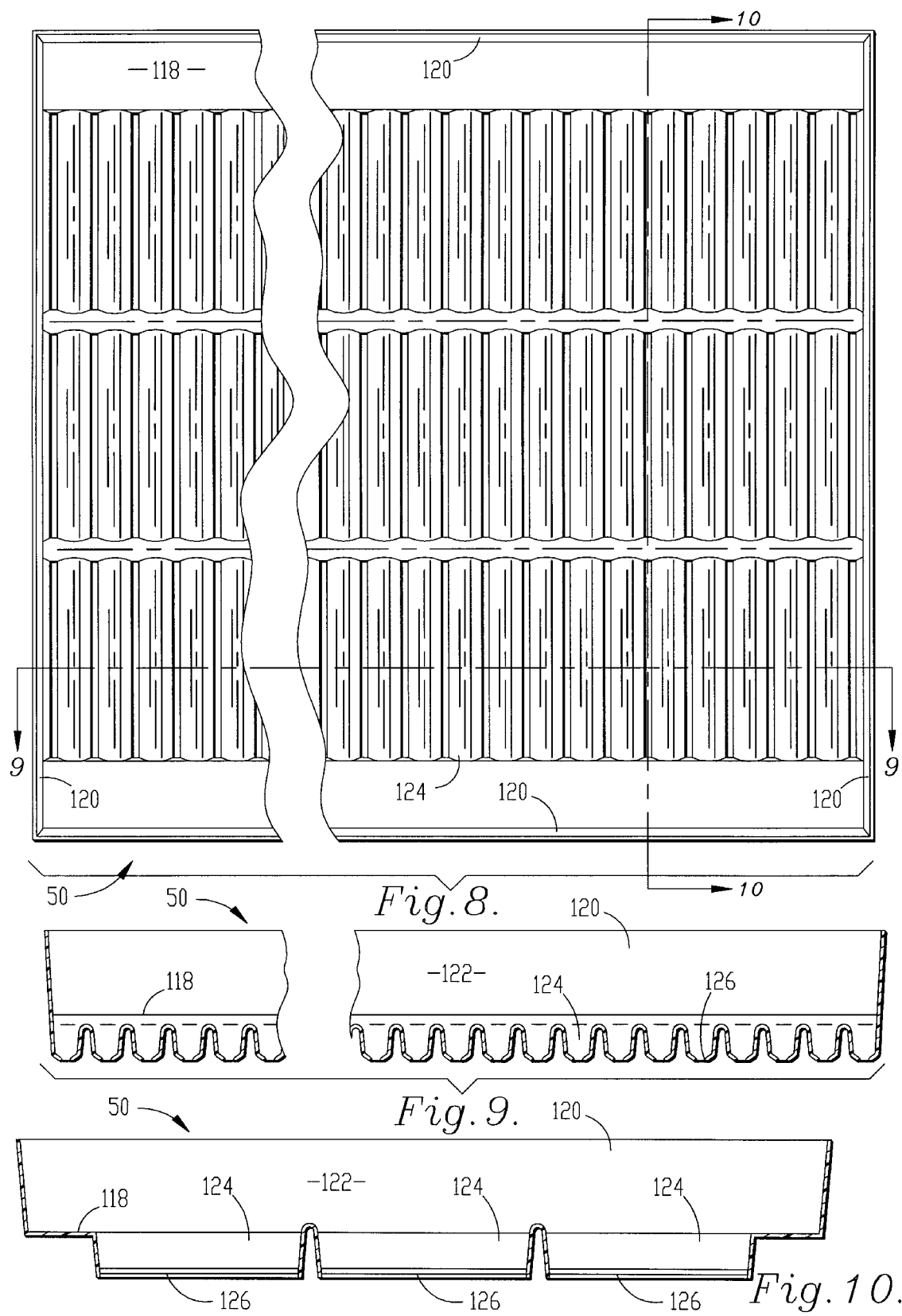

DRY-AIR-SURFACE HEAT EXCHANGER

RELATED APPLICATION

The present application is a continuation-in-part of application Ser. No. 08/705,635 filed Aug. 30, 1996 now abandoned, and entitled DRY-AIR-SURFACE HEAT EXCHANGER.

BACKGROUND OF THE INVENTION

1. Field of the Invention

The present invention relates generally to air-cooled, dry-heat exchangers, and more particularly to an assembly for use as a part of an air-cooled, atmospheric water cooling tower for cooling a liquid with currents of air.

2. Discussion of the Prior Art

Processes employing air-cooled, dry external surface heat exchangers operate with elevated fluid-return temperatures as compared with the fluid-return temperatures obtainable by wet evaporative cooling. This results from the fact that system efficiencies are usually less with air-cooled, dry heat exchangers of the same size as an evaporative-type, wet heat exchange. As a consequence, as heat loads increase it is often impractical to use air-cooled dry heat exchangers because of their relative inefficiency.

In certain instances though, the use of wet evaporative heat exchangers presents siting problems because of the necessity or desirability of limiting formation of a visible discharge or plume oftentimes encountered with large conventional evaporative or wet-type water cooling towers. The use of dry towers also offers the advantage of limiting the loss of liquid as a result of the evaporative effect. Furthermore, dry towers allow cooling of fluids other than water, which would preclude the use of an evaporative tower. Fog or plume abatement and the concomitant advantages of dry heat exchange have led to proposals that the dry concept be employed in larger industrial-sized towers, and that evaporative fill and air-cooled heat exchangers be incorporated into a single tower. This is especially attractive because the more efficient wet section of a dual-type tower can be utilized alone when ambient weather conditions permit, but such use can be lessened with the consequent increased initiation or use of the dry section as may be necessary for plume abatement under particular cold or cooler climate conditions.

Exemplary in this respect is the fact that a wet surface water cooling tower having a selectively usable dry surface heat exchanger unit as an integral part thereof may be locatable in closer proximity to a roadway than would otherwise be the case because of the plume abatement afforded by the added dry section. Without adequate plume abatement, location of a wet cooling tower in proximity to a roadway could result in obstructed visibility hazards which would preclude such positioning of the tower.

Another problem associated with finned tube heat exchangers, and especially those of relatively large capacity, stems from the high cost of producing the heat exchangers and the water delivery and return mechanisms especially adapted for use therewith. As such, the more efficient and less expensive evaporative water cooling towers are preferred over air-cooled heat exchangers even in situations where the advantages of dry heat exchange would otherwise be manifest.

An attempted solution to the foregoing problems is set out in U.S. Pat. No. 3,995,689, to Cates and assigned of record to the assignee of the present application. In the '689 patent, an air-cooled atmospheric heat exchanger is illustrated as including a plurality of U-shaped members arranged in a pack, wherein each member is preformed out of a low cost synthetic resin material such as polyvinyl chloride. Each U-shaped member presents a pair of side-by-side panels that are connected together by a common, longitudinally extending upper edge, and the panels of each member present front and rear, vertically extending side edges that are sealed to the side edges of the panels on adjacent members in the pack. The space between the panels of adjacent members is thus sealed along the front and rear edges to define respective vertical water passages that are separate from the air passages defined between the panels of each individual member, and each panel presents a wettransfer surface adapted to transfer heat between the water and the panel, and a dry-transfer surface adapted to transfer heat between the panel and air passing through the pack.

The solution proposed by the '689 patent did not find commercial acceptance for several reasons. For example, negative pressures tend to develop within the water passages of the pack and cause the relatively thin panels of the members to collapse toward adjacent members, disfiguring the panels and causing channeling of the water within the pack. As such, the efficiency of a heat exchanger constructed in accordance with the '689 patent is substantially compromised.

In an attempt to overcome the foregoing adverse effect created by the siphoning of water through the heat exchanger, the '689 patent teaches that air can be intentionally entrained in the hot water entering the top of the pack to slow the travel of the water through the heat exchanger and preclude the buildup of negative pressures between the panels of adjacent members. The negative pressures that built up between the sheet sections defining the upright water passages were so great that the sheet sections collapsed toward one another thus creating restrictions in downward flow of water and limiting the overall efficiency of the equipment. The patentee in the '689 patent sought to eliminate leaking of water from the water passages defined by the pack sheets by causing air to be entrained in the water entering the water passages. However, this was found to be only partially satisfactory, and the problem was exacerbated by difficulties in effectively sealing the interengaging edges of the sheets, particularly at the air inlet face of the patent.

Another drawback experienced in the construction of the proposed heat exchanger of the '689 patent resides in the requirement that both the front and rear edges of each water flow passage be sealed to prevent air and water from leaking into or out of the water passages defined between the members. Although it was theorized that the siphoning effect of water passing through the heat exchanger would combine with the positive pressure of air flow through the pack to hold the rear edges of adjacent members against one another, it was found that the front edge of each water flow passage in that air impinging on the front edge tended to enter the water passage and become drawn into the water passing between adjacent members. When air was thereby allowed into the water passage at any point along the length thereof, the air affected the movement of water between the members, creating channeling of the liquid flow.

Other problems also existed in constructing a heat exchanger in accordance with the '689 patent. For example, in order to support the members of each pack, the members were provided with aligned openings within which a support member was received, and the members had to be sealed at the openings to prevent air and water from leaking into or out of the water passages defined between the members.

Further, the construction suggested in the '689 patent employed spacers protruding into the air passages such that air pressure between the front and back of the pack dropped substantially, thus adversely affecting the efficiency of the heat exchanger.

OBJECTS AND SUMMARY OF THE INVENTION

It is an object of the present invention to provide an assembly for use as a part of an atmospheric water cooling tower for cooling a liquid with currents of air and which is porived with dry-air-surface heat exchanger formed of individual members, each including a pair of panels that are folded together along a vertical axis and sealed along the side edges thereof to present a vertical water flow passage between the panels and a pair of outer, horizontally extending air flow passages across the outside surfaces of the panels.

Preferably, the heat exchanger for use as a part of an atmospheric water cooling tower includes a plurality of the members, arranged in a pack, and a support means for supporting the members side-by-side, with the surfaces of the folded members oriented parallel to one another. It is also an object of the invention to provide a diffuser adjacent the upper edges of the folded members for receiving hot water and directing the hot water between the panels of each folded member. The diffuser means is constructed and arranged to seat against the upper edges of the folded members to block air from being entrained in the water that is introduced between the panels of each member. Collection means is also provided for collecting cooled water exiting from between the panels.

It is another object of the invention to provide such a heat exchanger having heat exchange members formed of synthetic resin material and including spacers for maintaining a predetermined spacing between panels and for restricting the panels from being disfigured during use attributable to negative pressure that might build-up in the water flow passages between the panels. Further, it is an object to provide a construction in which air is substantially blocked from being entrained in the water passing through the heat exchanger, both along the side edges of the members and at openings therein at which support members extend through the members.

Another object of the present invention is to provide a dry-air-surface heat exchanger for use as a part of an atmospheric water cooling tower and having relatively open, unobstructed air passages between adjacent members, minimizing pressure drop between the front and rear edges of the heat exchanger and increasing efficiency relative to conventional constructions.

In accordance with these and other objects evident from the following description of a preferred embodiment of the invention, a dry-air-surface heat exchanger is provided for use in an atmospheric water cooling tower. The heat exchanger includes a preformed, shape-retaining heat transfer member of relatively thin synthetic resin sheet material presenting a pair of upright, side-by-side panels, vertically extending side edges, horizontally extending upper and lower edges, a wet-transfer surface adapted to transfer heat between the water and the member, and a dry-transfer surface adapted to transfer heat between the member and air. The member is folded about a vertical axis, with the wet-transfer surfaces in facing relationship so that the vertical axis defines a front edge of the heat exchanger. In addition, the folded member is configured to present a series of tortuous water flow paths between the panels extending between the upper and lower edges, and the side edges are secured together in substantially fluid tight sealing engagement.

By providing a heat exchange member constructed in accordance with the present invention, numerous advantages are realized. For example, by forming the member with a pair of upright, side-by-side panels, it is possible to fold the member and seal the edges together to obtain a substantially leak proof water flow passage between the upper and lower edges of the panel. In addition, it is possible to employ spacers for maintaining the spacing between the panels within the water flow passage without interfering with the passage of air horizontally across the outer surfaces of the panels. The spacers prevent the panels from being disfigured by negative pressures within the water flow passage, reducing channeling and improving the efficiency of the heat exchanger.

By providing the preferred construction as discussed, it is possible to further control the flow of water and air through the heat exchanger to prevent air from being entrained in the water. The diffuser is constructed in a manner to seal the upper water inlets of the side-by-side panel members, thus preventing water from entering the air passages therebetween.

The liquid passages of the dry-air-surface heat exchanger are of dimensions such that the center-to-center spacing between the panels of each tubular heat transfer member is from about 1 to about 1.5 inches and the ratio of the liquid space volume of the combination of the total volume of the air passages and the liquid passages is from about 0.35 to about 0.6. This critical relationship was surprisingly found to provide an optimum balance between hydraulic operation and efficient transfer of heat in the water to the cooling air currents directed through the heat exchanger at an economical overall water cooling tower cost.

A particularly important object of this invention is its utility as a dry-air-surface heat exchanger to be used without significant change in a water cooling tower where plume abatement is a requirement, in a cooling tower installation where water conservation is the primary goal, or as a stand-alone unit as a substitute for a finned tube heat exchanger.

BRIEF DESCRIPTION OF THE DRAWING FIGURES

The preferred embodiment of the present invention is described in detail below with reference to the attached drawing figures, wherein:

FIG. 3 is a front elevational view of an unfolded heat transfer member forming a part of the heat exchanger of the preferred embodiment;

FIG. 4 is a top plan view of the unfolded heat transfer member; and

FIG. 5 is a top plan view of the heat transfer member subsequent to folding.

Figure 7:
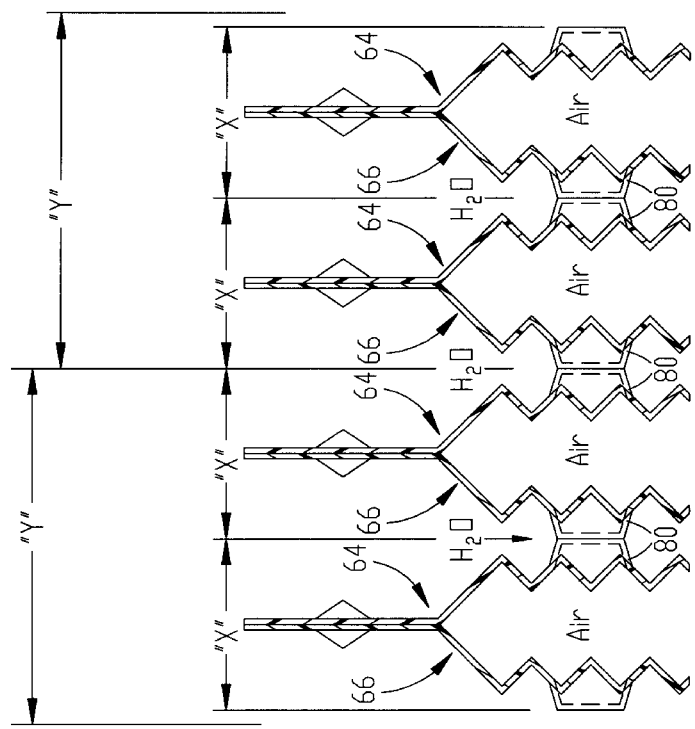
Figure 11:
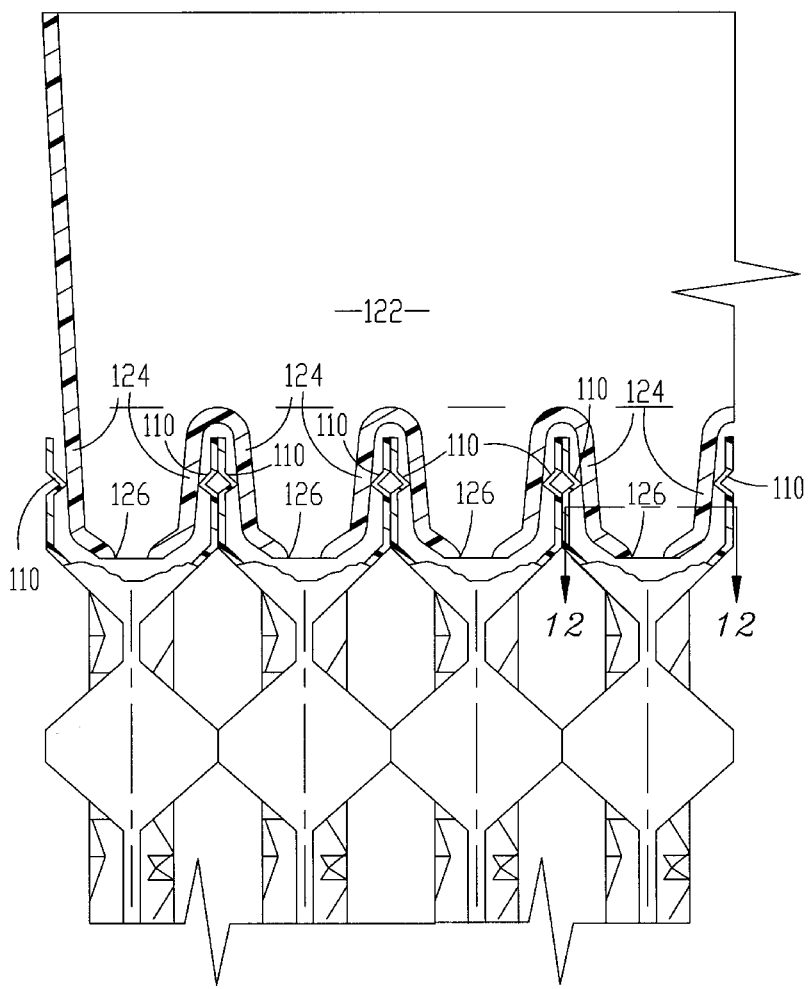
Figure 12:
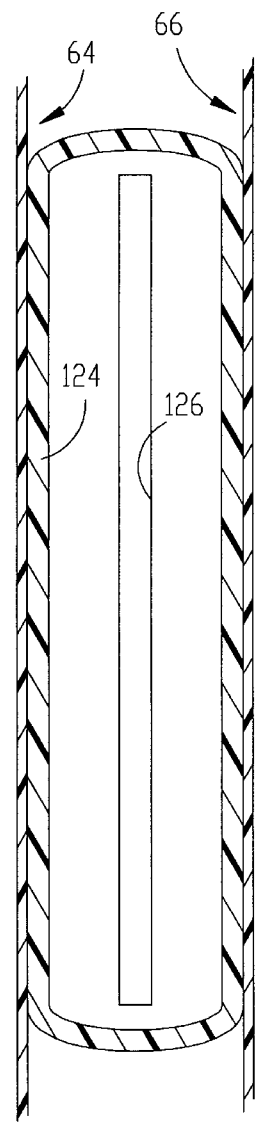
Figure 13:
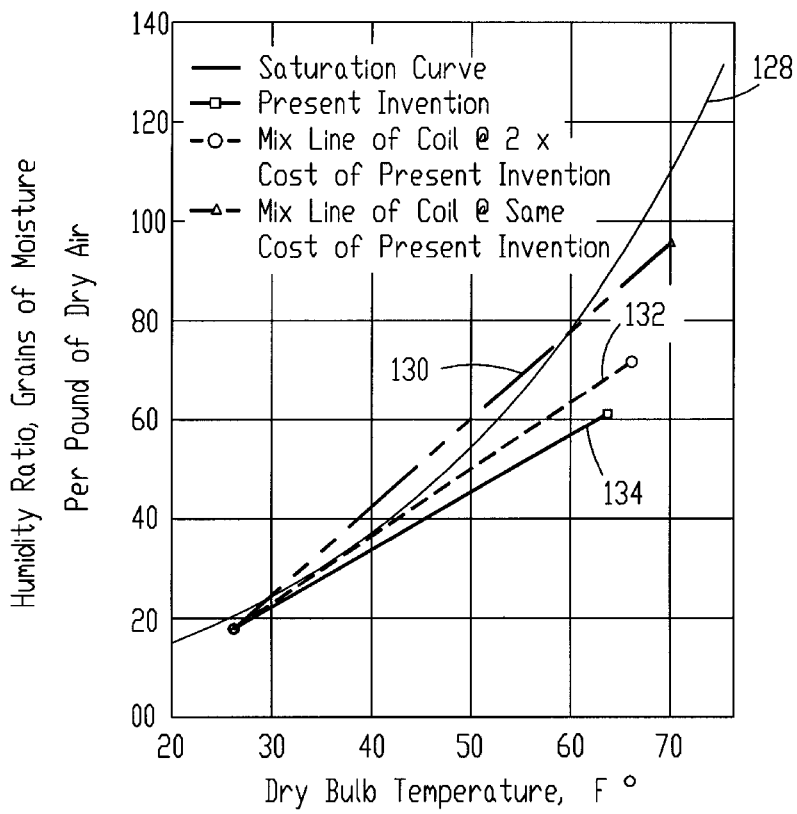
Figure 14:
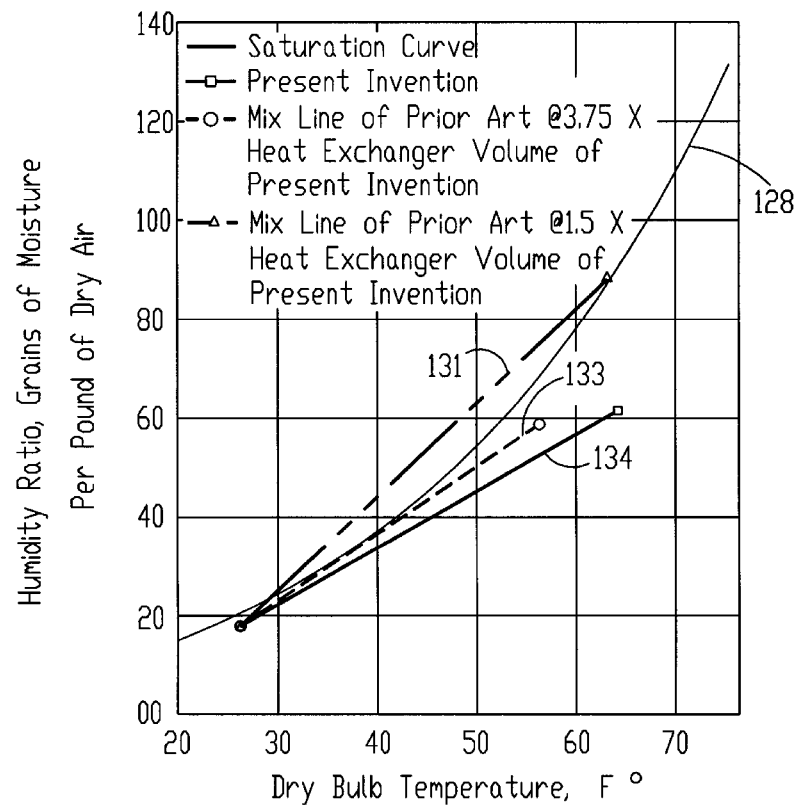
Figure 15:
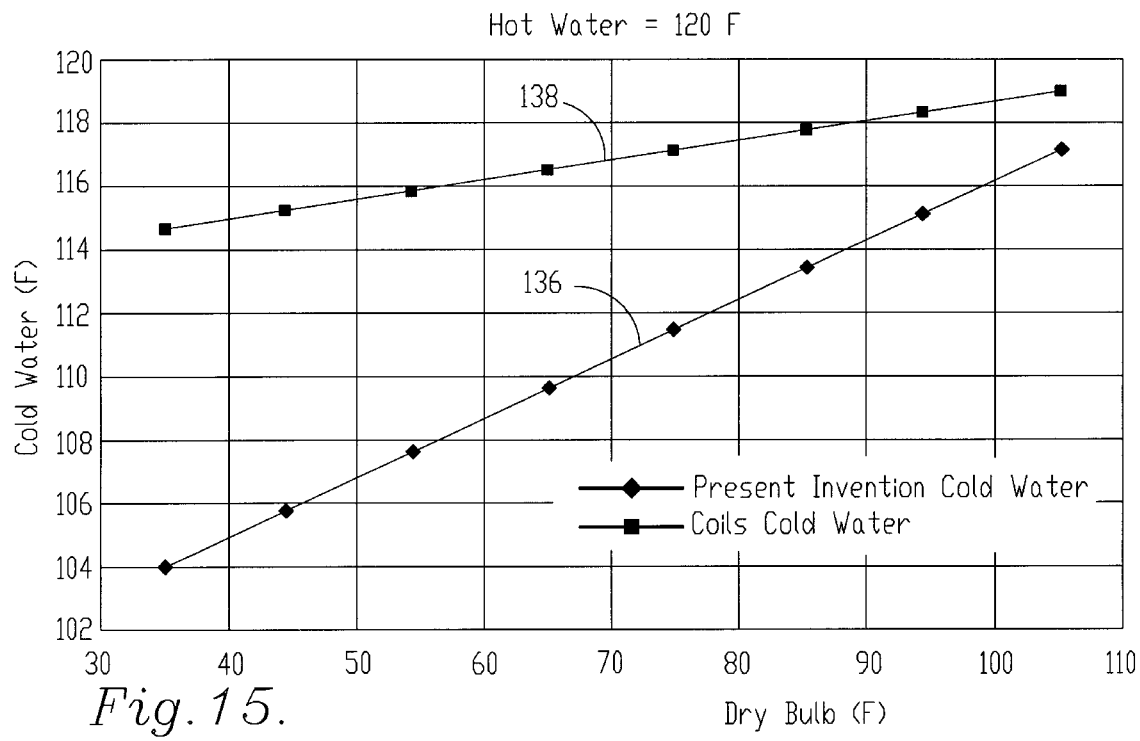
Figure 16:
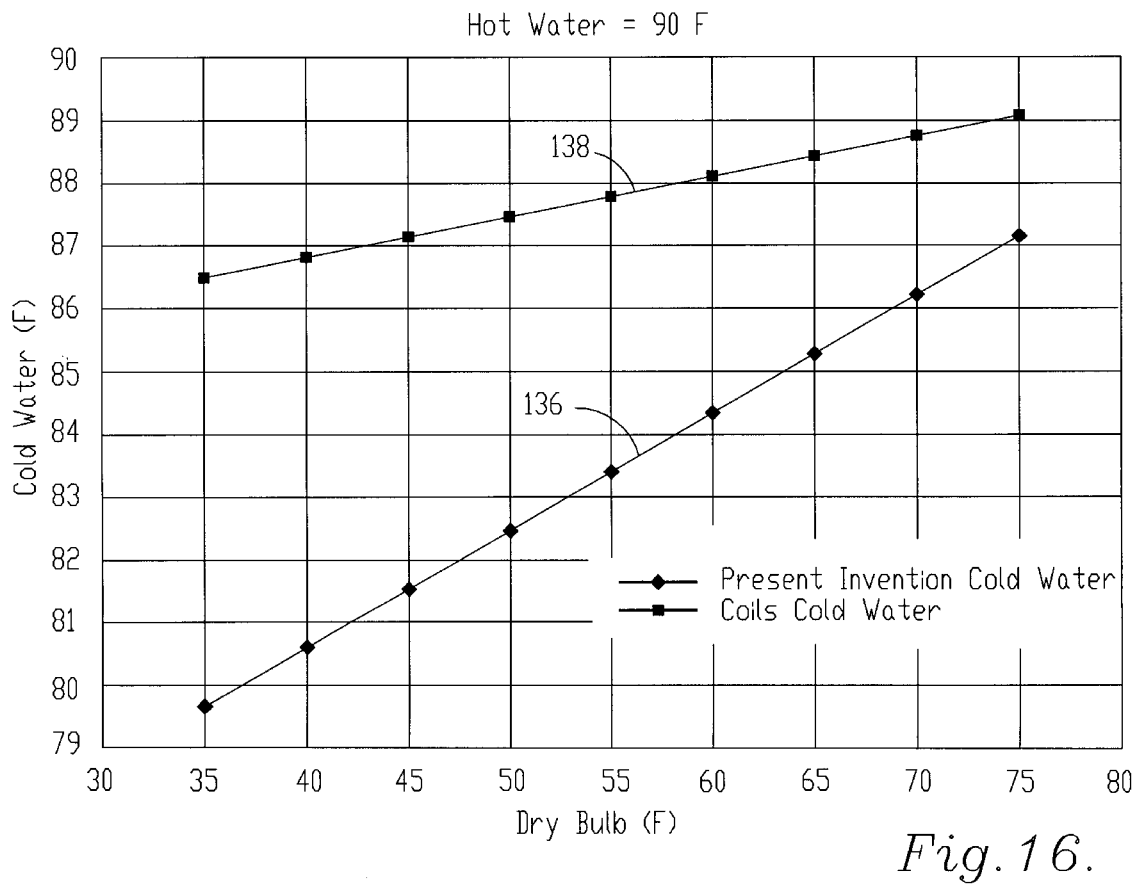
Figure 18:
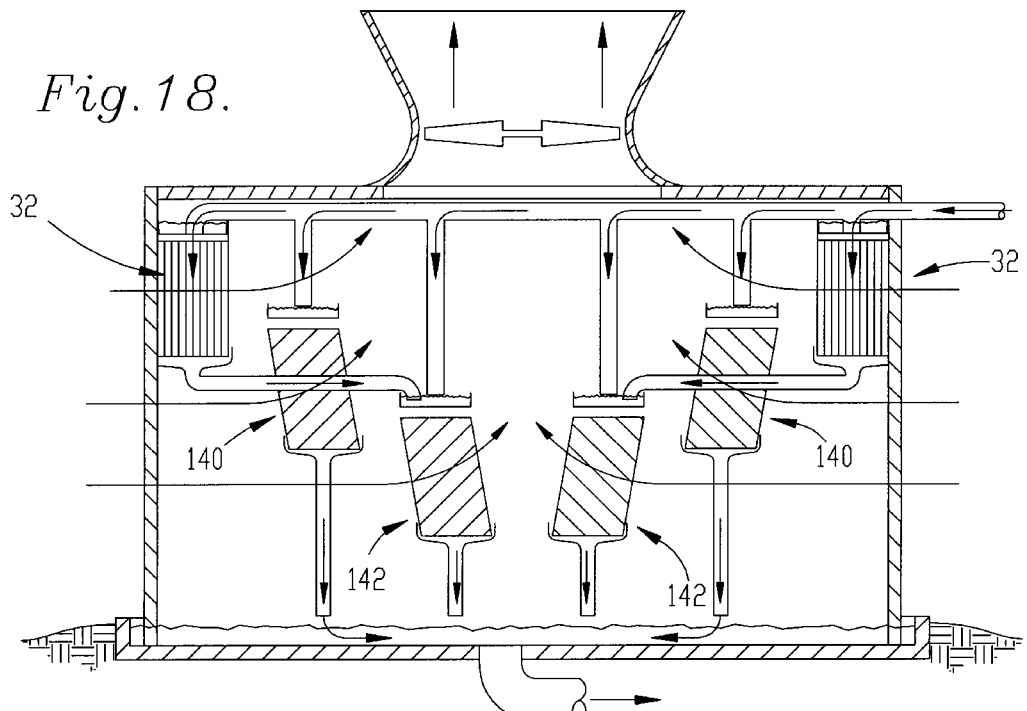
Figure 17:
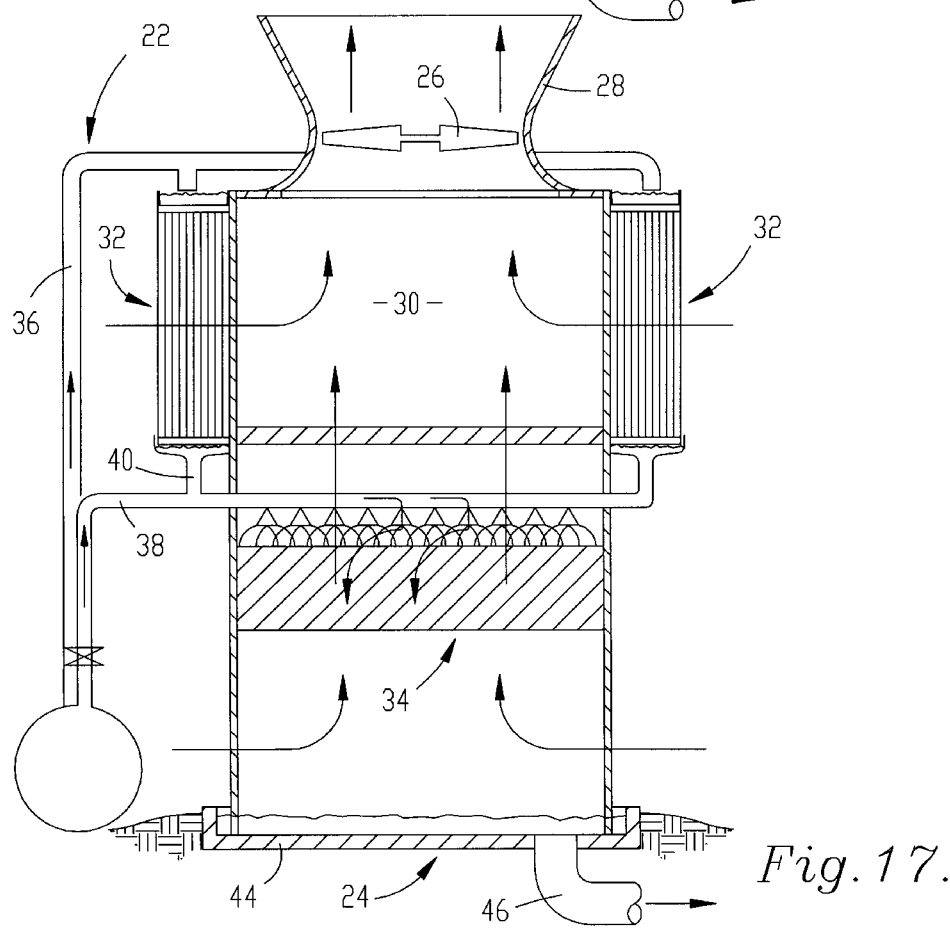
Figure 19:
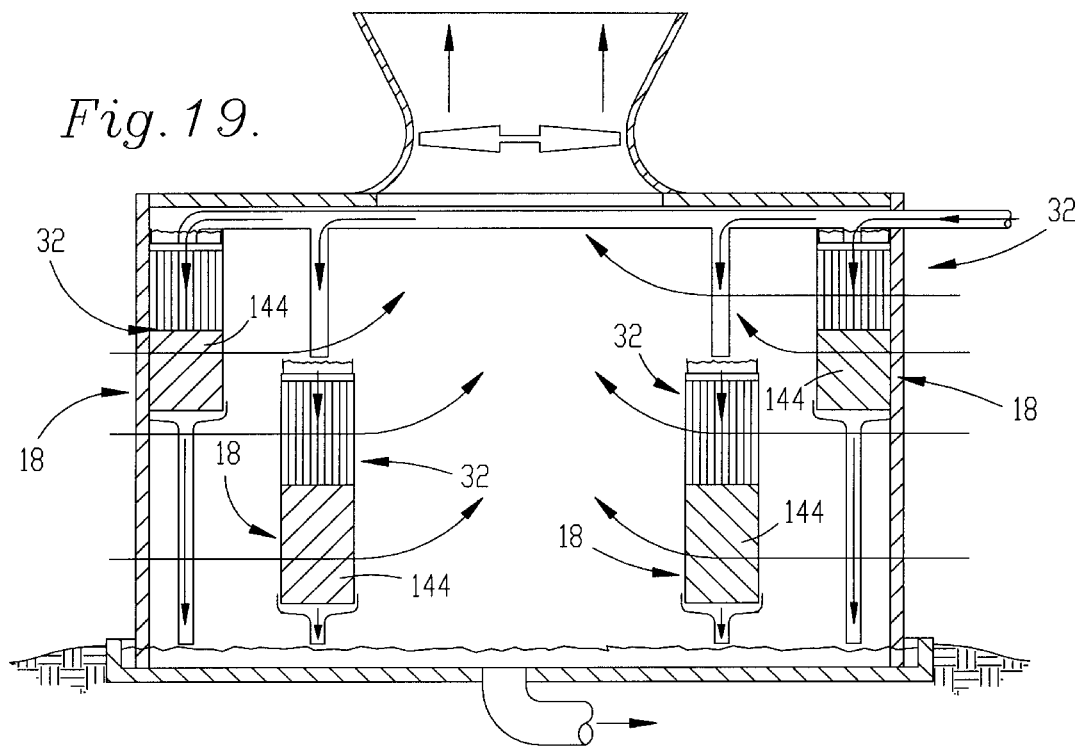
Figure 20:
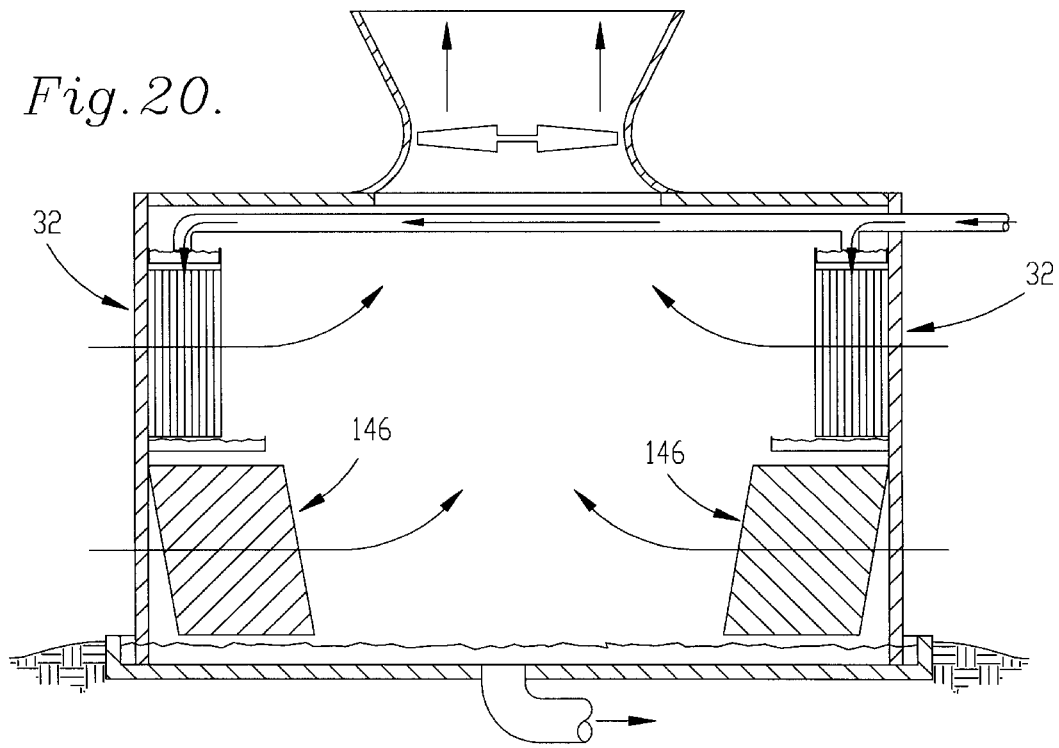
Figure 21:
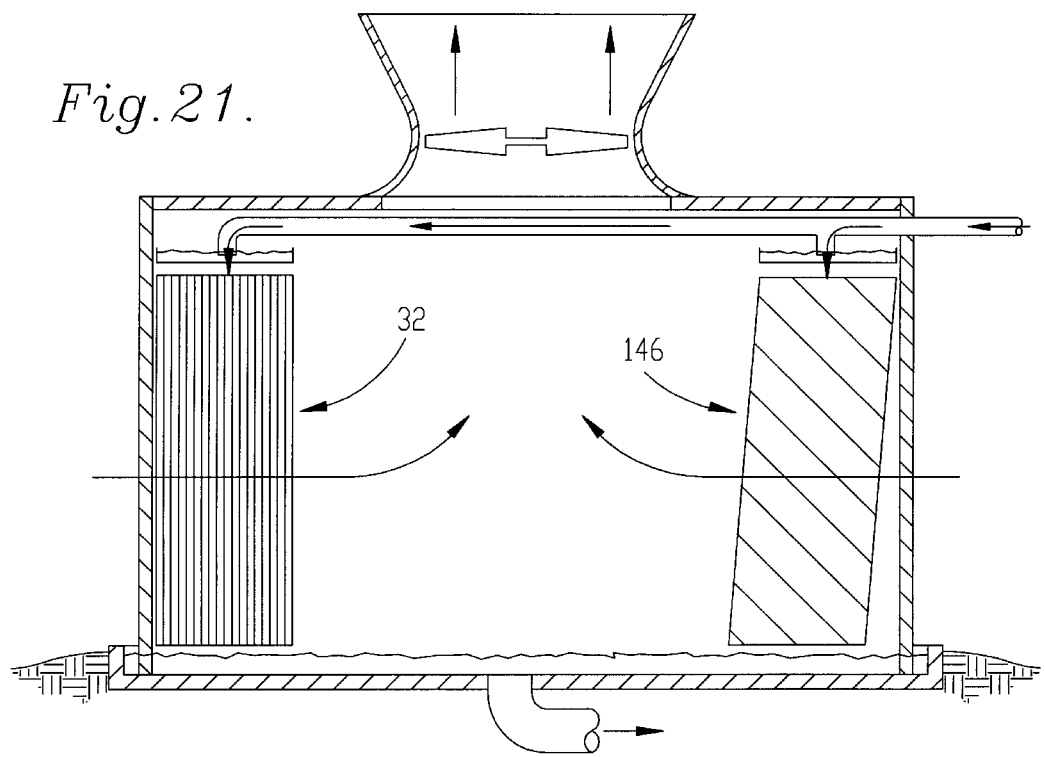
Figure 22:
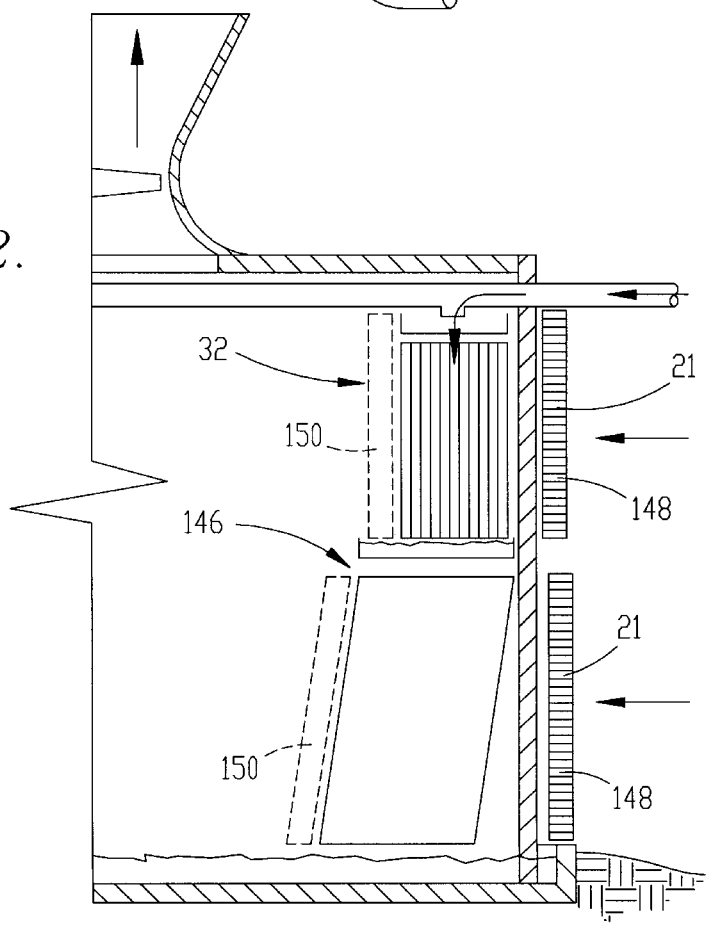
Figure 23:
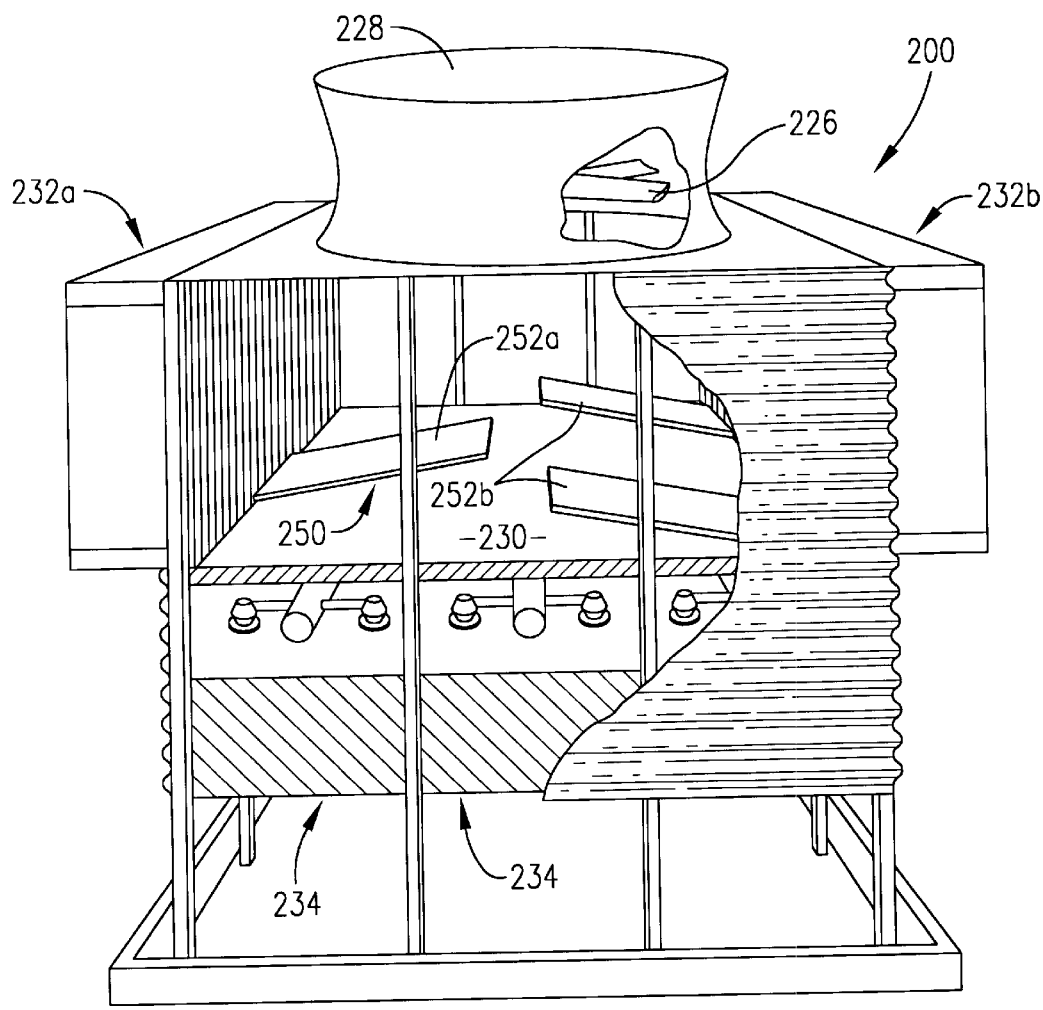

Cates patent referred to above, illustrating the relative transverse passages dedicated to water flow and air flow, respectively;

FIG. 7 is a fragmentary vertical sectional view of an air-cooled heat exchanger constructed in accordance with the present invention, illustrating the passages dedicated to water flow and air flow, respectively;

FIG. 8 is a fragmentary top plan view of a hot water diffuser forming a part of the air-cooled heat exchanger of the preferred embodiment;

FIG. 9 is a sectional view of the diffuser taken along line 9—9 of FIG. 8;

FIG. 10 is a sectional view of the diffuser taken along line 10—10 of FIG. 8;

FIG. 11 is fragmentary front elevational view of the heat exchanger of the preferred embodiment, partially sectioned to illustrate the orientation of the diffuser relative to heat transfer members forming a part of the heat exchanger;

FIG. 12 is a sectional view taken along line 12—12 in FIG. 11;

FIG. 13 is a graphical representation illustrating a psychometric analysis of the plume abatement capabilities of an air-cooled heat exchanger constructed in accordance with the present invention as compared with the capabilities of two conventional finned tube heat exchanger constructions;

FIG. 14 is a graphical representation illustrating a psychometric analysis of the plume abatement capabilities of an air-cooled heat exchanger constructed in accordance with the present invention as compared with the capabilities of two other conventional heat exchanger constructions;

FIG. 15 is a graphical representation illustrating the water cooling capability of an air-cooled heat exchanger constructed in accordance with the present invention as compared with that of a conventional finned tube heat exchanger construction of comparable cost at a hot water temperature of 120° F.;

FIG. 16 is a graphical representation similar to FIG. 15, illustrating the water cooling capabilities of the air-cooled heat exchangers at a hot water temperature of 90° F.;

FIG. 17 is a schematic representation of a mechanical draft cooling tower employing separate air-cooled crossflow heat exchanger units in combination with conventional counterflow evaporative fill units;

FIG. 18 is a schematic representation of a mechanical draft cooling tower employing separate air-cooled crossflow heat exchanger units in combination with conventional crossflow evaporative fill units;

FIG. 19 is a schematic representation of a mechanical draft crossflow cooling tower employing separate air-cooled heat exchanger units positioned atop conventional evaporative fill units;

FIG. 20 is a schematic representation of a mechanical draft crossflow cooling tower employing separate air-cooled heat exchanger units positioned above conventional evaporative fill units;

FIG. 21 is a schematic representation of a mechanical draft crossflow cooling tower employing separate air-cooled heat exchanger units on one side thereof and conventional evaporative fill units on the other side thereof;

FIG. 22 is a fragmentary schematic representation of a mechanical draft crossflow cooling tower as shown in FIG. 19, illustrating various optional components forming a part of the cooling tower; and FIG. 23. is a fragmentary, perspective view of a mechanical draft, plume abatement atmospheric water cooling tower employing upper, air-cooled heat exchanger units, lower, counterflow, evaporative wet fill units and air stream mixing baffles.

DETAILED DESCRIPTION OF THE PREFERRED EMBODIMENT

A combination wet section counterflow and dry section cross-flow atmosphere mechanical draft cooling tower is shown schematically in FIG. 17, and broadly includes a hot water distribution assembly 22, a cold water collection assembly 24 and a central, mechanically powered fan 26 circumscribed by an upright, venturi-shaped stack 28 positioned atop the tower on an apertured fan deck for inducing ambient derived air currents through the tower. A central plenum 30 is defined between respective opposed units of the heat exchanger apparatus of the tower. The apparatus may be annular in shape, or provided in separate, opposed rectangular sections as illustrated. The walls of the tower are provided with apertures into which ambient air is drawn by the fan 26, and the air passes through the heat exchanger apparatus into the central plenum 30 before passing out of the tower past the fan.

Figure 1:
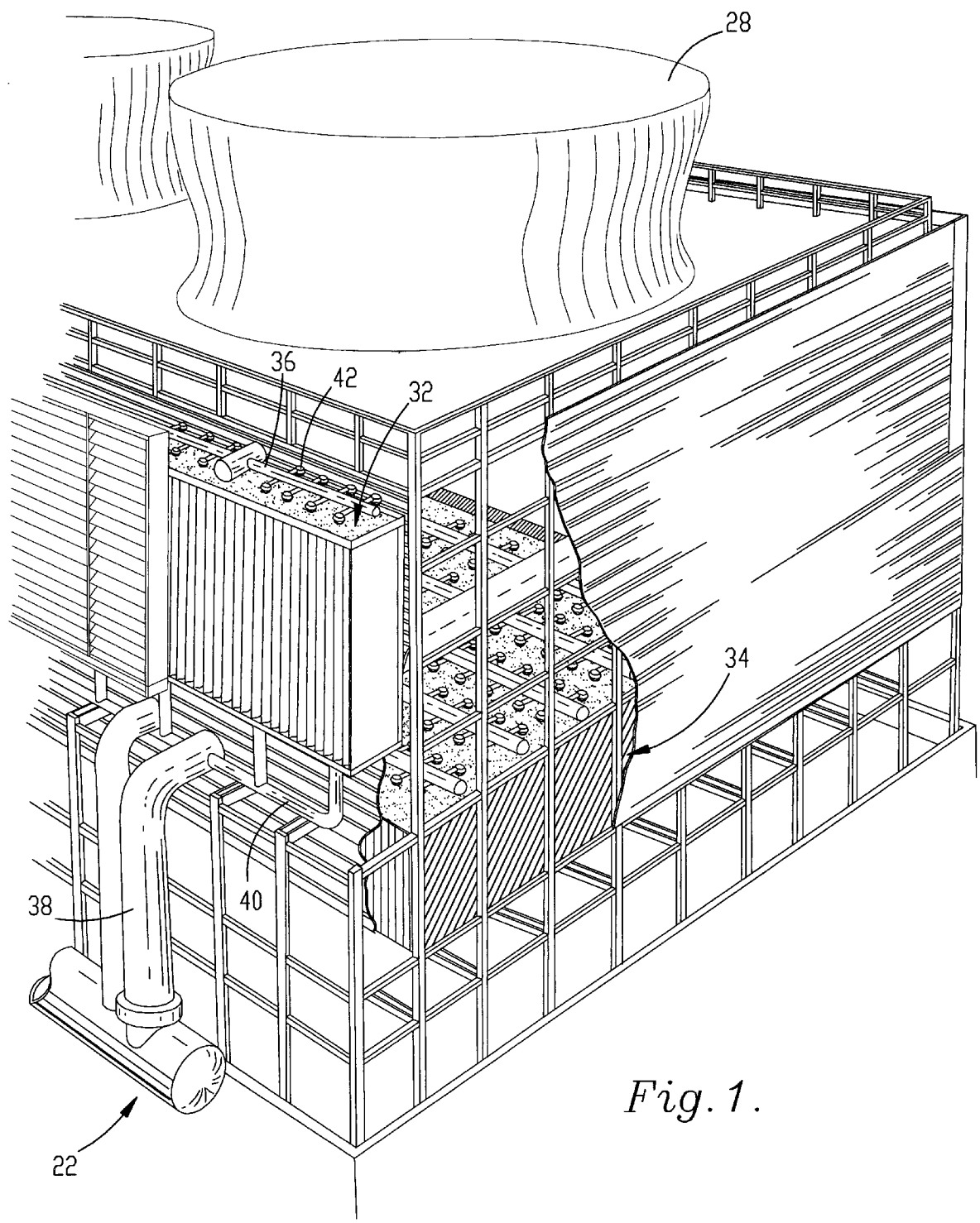
FIG. 1 is a fragmentary perspective view of a water cooling tower, partially cut away to illustrate an air-cooled heat exchanger constructed in accordance with the preferred embodiment.

The heat exchanger apparatus is illustrated in FIG. 1, and includes upper, dry-air-surface heat exchanger units 32 constructed in accordance with the preferred embodiment, and lower, conventional evaporative wet fill units 34. The hot water distribution assembly includes a first set of distribution lines 36 for distributing hot water to the upper units for cooling, and a second set of distribution lines 38 for distributing hot water directly to the lower fill units. The second set of lines also includes collection lines 40 for collecting cooled water from the upper units so that water exiting the upper units can be directed into the lower fill units 34 for further cooling. Nozzles 42 or the like are provided for evenly distributing water over the upper and lower units to obtain uniform cooling of the water passing through the units. The cold water collection assembly is shown in FIG. 17, and includes a base 44 underlying the lower fill units, and a return line 46 for removing cooled water from the tower.

Figure 2:
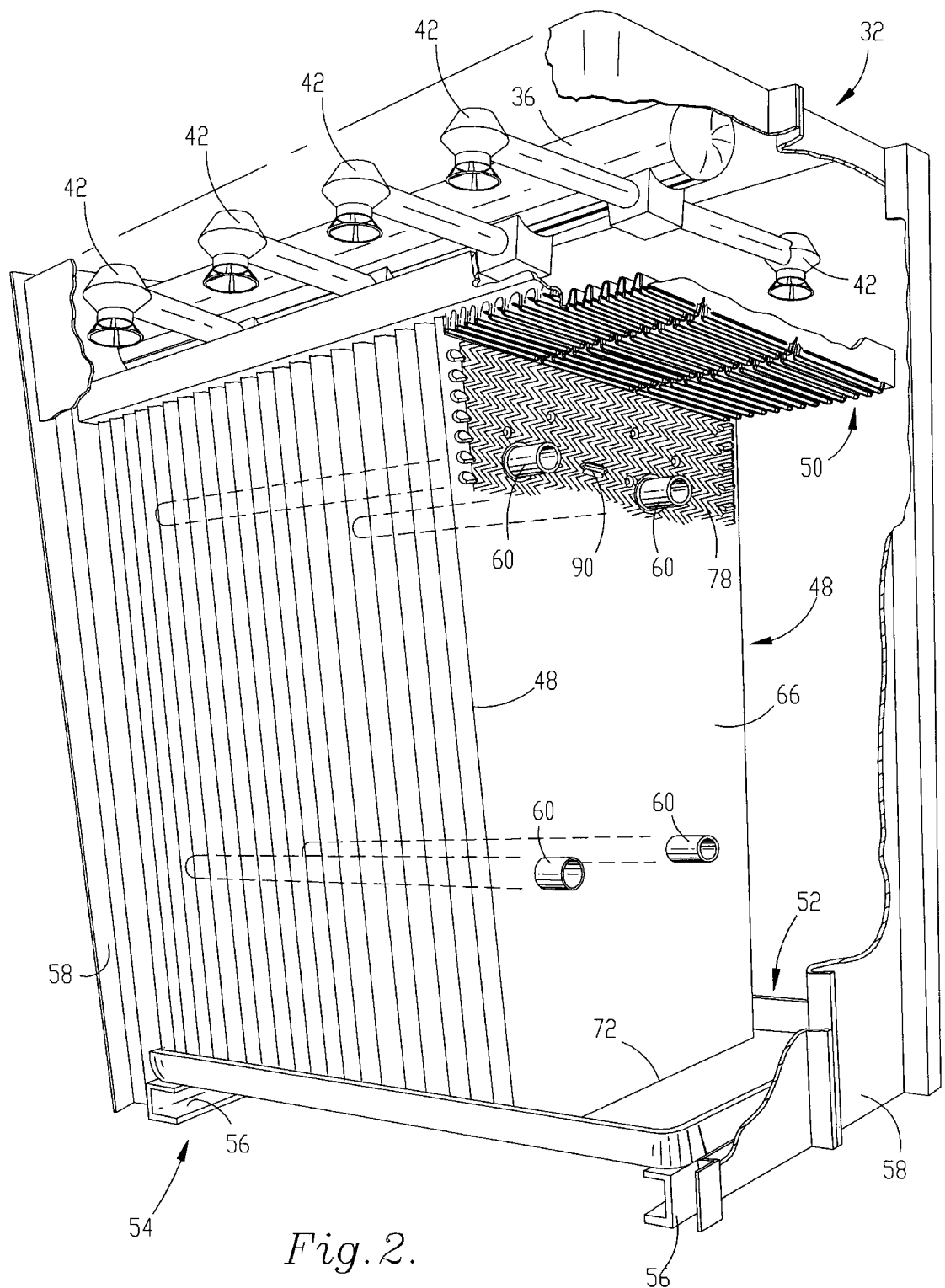
FIG. 2 is a perspective view of the heat exchanger, partially cut away to illustrate various components forming a part thereof.

The dry-air-surface heat exchanger units 32 are generally identical to one another, and one of the units is illustrated in FIG. 2. Generally, the unit includes a plurality of individual, discrete, tubular members 48 supported in an upright, side-by-side orientation within a pack, a diffuser 50 for receiving hot water from the hot water distribution assembly and directing the hot water into the pack, for gravitational flow downwardly through respective members 48 and a collection basin 52 for collecting cooled water exiting the pack. Each of the tubular members 48 has a generally horizontal, elongated liquid inlet at the upper end thereof and a corresponding, generally horizontal, elongated liquid outlet at the lower extremity of the tubular member in substantial vertical alignment with the liquid inlet thereabove. A series of the tubular members 48 are provided in side-by-side relationship presenting the pack thereof with the elongated side margins of the liquid in proximal, side-by-side, substantially abutting relationship. A frame 54 supports the collection basin 52, diffuser 50 and pack, and includes a pair of front-to-rear beams 56 underlying the collection basin, a pair of upstanding side walls 58 enclosing the sides of the pack, and a plurality of support tubes 60 extending through the pack between the side walls 58. The front side of the frame is open, defining an air inlet into which ambient air is drawn. The rear side of the frame is also open and defines an air outlet of the unit. As such, the front side of the frame is exposed to an opening in the tower while the rear side of the unit opens into the central plenum 30, as shown in FIG. 17.

Returning to FIG. 2, the collection basin 52 is supported on the beams 56 and defines an open reservoir beneath the pack into which cooled water falls from the members 48. A drain is provided in the basin and is connected through the collection lines 40 (FIG. 17) to the hot water distribution lines for introduction into the lower fill units, as shown in FIG. 1. Alternately, the drain can be connected directly to the water collection assembly where the dry-air-surface heat exchanger units are to be used exclusively, independent of the lower fill units.

Each individual member 48 forming a part of the pack is substantially identical to every other member, and is preformed from a shape-retaining, relatively thin synthetic resin sheet material such as polyvinyl chloride or the like. As shown in FIG. 3, the preformed sheet of each member 48 is generally rectangular in shape, and is divided by a central, longitudinal axis 62 into two side-by-side panels 64, 66. A center margin 68 including the longitudinal axis separates the panels from one another and extends between upper and lower edges of the sheet. Marginal side edges 74, 76 also extend between the upper and lower edges.

A dry-transfer surface of the sheet is shown in FIG. 3, and is adapted to transfer heat from the member to air passing over and contacting the surface. The opposing surface of the sheet is complemental in shape to the dry-transfer surface, and serves as a wet-transfer surface for transferring heat from hot water to the member as the water passes over and contacts the surface during use. Each panel also presents a corrugated chevron or zigzag pattern 78 formed therein between the upper and lower edges of the sheet. The pattern 78 defines a plurality of side-by-side, normally vertically extending serpentine water flow paths in the wet-transfer surface.

It is to be observed from FIG. 3 that the corrugated chevron or zigzag pattern 78 is made up of a series of grooves which are defined by peaks and valleys, defining a groove transversely thereof. In addition, the grooves are of V-shaped configuration in the plane of each panel with the V's alternately opening toward opposed side edges of the sheet 64. The maximum vertical extent of each oppositely opening V groove may be defined as the height of that groove. The included angle of each of the oppositely opening V grooves is preferably the same for all of such grooves. A regular pattern of protrusions 80 is formed in each panel, wherein each protrusion is of truncated conical shape and protrudes from the wet-transfer surface of the panel, terminating in a generally planer end surface adapted to engage a similarly oriented spacer on the opposing panel when the member has been folded about the vertical axis 62. The protrusions 80 are uniformly spaced from one another over the area of the panel and each serves to define a spacing means for maintaining a predetermined space between the wet-transfer surfaces of the panels to prevent the panels from caving in toward one another during use when a negative pressure occurs within the member.

The panel 64 includes a plurality of identically configured, vertically spaced nesting elements 82 that are formed in the sheet at the time of manufacture. Each nesting element 82 is generally oval in shape, defining a longitudinal axis extending in a direction perpendicular to the upper and lower edges of the sheet. In addition, each element protrudes from the wet-transfer surface of the panel and presents an elongated ridge 84 along the longitudinal axis. The ridge is interrupted by a pair of vertically spaced transverse recesses 86. A pair of laterally spaced projections 88 are provided on each nesting element 82, wherein the projections are disposed on opposite sides of the ridge 84 and protrude from the dry-transfer surface of the panel 64. Each projection 88 is oval in shape, presenting a central, longitudinally extending ridge that extends in a direction parallel to the longitudinal axis of the element 82.

The panel 66 also includes a plurality of identically configured, vertically spaced nesting elements 90 that are formed in the sheet at the time of manufacture. Each nesting element 90 is generally oval in shape, defining a longitudinal axis extending in a direction parallel to the upper and lower edges of the sheet. In addition, each element protrudes from the dry-transfer surface of the panel and presents an elongated ridge 92 along the longitudinal axis. The ridge is interrupted by a pair of horizontally spaced vertically extending recesses 94. A pair of vertically spaced projections 96 are provided on each nesting element, wherein the projections are disposed on opposite sides of the ridge and protrude from the wet-transfer surface of the panel. Each projection is oval in shape, presenting a ridge that extends in a direction parallel to the longitudinal axis of the element 90.

The elements 82 are aligned with the elements 90 so that when the member is folded about the vertical axis 62, the ridges of the projections 96 on the panel 66 engage the recesses 86 in the ridges 84 of the elements 82, positioning the panels 64, 66 relative to one another while maintaining a space between the wet-transfer surfaces thereof. Thus, the nesting elements 82, 90 cooperate with the protrusions 80 to define the spacing means.

Provision is made in the preformed sheet of each member for permitting a plurality of openings to be cut in the member to accommodate the support tubes. Preferably, this provision includes the formation of a plurality of circular, generally planer areas 98 in each panel, wherein each area may be cut from the sheet in order to receive one of the support tubes. The opening areas 98 in the two panels are oriented such that, upon folding of the member about vertical axis 62, the openings in each panel align with the openings in the other panel.

Preferably, each opening area in the panel 64 is surrounded by a tubular, preferably annular, ridged margin 100 that protrudes from the dry-transfer surface of the sheet, and each opening area in the panel 66 is surrounded by an annular ridged margin 102 that protrudes from the wet-transfer surface of the sheet. As such, the annular margins 100, 102 formed in the two panels of each member nest against one another when the member is folded about the vertical axis and can be sealed shut with a suitable adhesive to substantially block air and water from leaking into or out of the water flow passage defined by the member.

The center margin 68 of the sheet is planer, being void of the chevron or zigzag pattern that dominates the panels 64, 66. A plurality of vertically aligned inlet spacers 104 are formed in the sheet along the margin beside each panel. Each spacer 104 protrudes from the dry-transfer surface of the sheet and is generally teardrop-shaped, defining a longitudinal axis that extends horizontally in a direction parallel to the upper and lower edges 70, 72. The teardrop shape of each spacer tapers horizontally away from the vertical axis 62 so that when the member is folded about the axis, defining the front edge of the member, the spacers present an aerodynamic profile to the air stream passing horizontally over the dry-transfer surfaces of the panels. The inlet spacers 104 on each side of the vertical axis are aligned with the spacers on the opposite side of the axis so that when the member is folded and assembled in the pack, the inlet spacers of adjacent members engage one another to maintain a space between the members through which air travels during use of the heat exchanger.

Two vertical rows of outlet spacers 106 are formed in the sheet along the side edges 74, 76 thereof, wherein each row includes a plurality of vertically spaced outlet spacers that protrude from the dry-transfer surface of the sheet. Each outlet spacer 106 is generally oval-shaped, defining a longitudinal axis that is angled relative to the upper and lower edges of the sheet by an angle of about 20°–35°. When the member 48 is folded about the axis 62, the edges of the sheet are placed against one another, defining a rear edge of the member, and the outlet spacers 106 present an aerodynamic profile to the air stream exiting the pack. The outlet spacers on each edge are aligned with the spacers on the opposite edge so that when the member is folded and assembled in the pack, the outlet spacers of adjacent members engage one another to maintain a space between the members through which air travels during use of the heat exchanger. In view of the angular positioning of spacers 106 they are strategically configured to direct air flow thereover upwardly toward the air outlet plenum and discharge stack or stacks of the tower Each panel 64, 66 of the member 48 is preformed to present a horizontally extending ridge 108 along the upper edge of the sheet that protrudes from the dry-transfer surface thereof. The ridges of the panels are aligned with one another so that when the member is folded about the vertical axis 62, an enlarged opening is defined between the wet-transfer surfaces of the panels, as shown in FIG. 5. Each ridge is formed with a horizontally extending groove 110, as shown in FIG. 3, that protrudes inwardly of the folded member, as shown in FIG. 5. The grooves apply pressure to the diffuser, as described below, so that hot water is directed between the panels and air is substantially blocked from being entrained in the water.

The configuration of the formed sheets is such that a repeating pattern of any desired length may be selected in order to accommodate differing tower heights. In addition, each sheet can be formed with more than one repeating, horizontally extending ridge 108 so that a single design of the sheet can be used in towers of at least two or more different heights. For example, in the construction illustrated in FIG. 3, a second ridge 108 is formed beneath the upper ridge and provides a line 111 along which the material can be cut in order to shorten the height of the member formed from the sheet. If the full length of the sheet is employed in constructing a member, the intermediate ridge 108 forms a part of the member and serves to space adjacent members within the pack from one another.

During assembly, the sheet forming each member 48 is folded along the vertical axis 62, as shown in FIG. 4, with the wet-transfer surfaces of the panels in facing relationship, and the outermost marginal side edges 74, 76 sealed together with an adhesive. In addition, the annular margins 100, 102 surrounding the opening areas are also adhesively sealed together. The protrusions 80 on the panel 64 engage the protrusions of the panel 66, as shown in FIG. 5, spacing the wet-transfer surfaces from one another to define a water flow passage extending from the upper edge of the folded member to the lower edge thereof. The nesting elements 82, 90 of the two panels nest against one another in the manner described above and orient the panels upon folding of the member, and also serve to maintain the space between the wet-transfer surfaces during use.

The chevron or zigzag pattern 78 in the panel 64 opposes the pattern formed in the panel 66, and is preferably designed so that each channel defined in the wet-transfer surface of the panel 64 extends in a direction opposite to the direction in which the opposing channel of the panel 66 extends. By providing this construction, liquid flowing downwardly between the panels is deflected in different directions by opposing channels in the panels, and tortuous liquid flow paths are defined within the member that are filled with liquid during use.

With reference to FIG. 2, a plurality of the folded members 48 are assembled on the support tubes 60 to form the pack of the heat exchanger, and the opening areas 98 of each member are cut out from the member in order to accommodate the support tubes. The pack is assembled by positioning a plurality of the members on the support tubes in side-by-side relation to one another.

The nesting elements 90 on each member protrude from the dry-transfer surface of the panel 66 and engage the projections 88 of the nesting elements 82 in the panel 64 of the adjacent member so that the projections 88 nest in the recesses 94 to properly orient the members relative to one another and maintain a spacing between adjacent members through which ambient air is drawn during use of the heat exchanger. In addition, the inlet spacers 104 and outlet spacers 106 of each member engage the inlet and outlet spacers of adjacent members in the pack to establish and maintain the spacing between the members. Thus, the nesting elements 82, 90, the inlet spacers 104, and the outlet spacers 106 cooperate to maintain the air flow passages between the members.

The aerodynamic profile of the inlet and outlet spacers 104, 106 serves to minimize the air pressure drop across the pack during use. In addition, the nesting elements 90 that protrude from the dry-transfer surface of each member are horizontally oriented so that they also present an aerodynamic profile that reduces the pressure drop of air passing through the pack. Because the nesting elements 82 protrude from the wet-transfer surface of each member, they do not impede air flow through the air passageways.

As previously noted, the liquid delivered to the water inlets of the tubular members 48 of the cooling tower illustrated herein is essentially at atmospheric pressure (typically no more than about 3 to 4 milibars difference from atmospheric pressure). Similarly, the cold water collection basin is open to the atmosphere. The mechanical draft tower hereof also is desirably provided with air moving means of characteristics such as to cause the velocity of the air currents passing through the pack of tubular members 48 to be from about 200 to about 1,000 feet per minute.

Preferably, as shown in FIG. 7, the horizontal transverse space, "X", occupied by each of the members 48 (comprising collectively the folded panels 64 and 66 and respective integral protrusions 80) should be from about 1 inch to about 1.5 inches, desirably from about 1.1 inches to about 1.3 inches, and preferably about 1.2 inches. By configuring the members 48 so that the horizontal space occupied by each is within the stipulated parameters, the efficiency of the pack in transferring heat between hot liquid flowing through the liquid passages to air being drawn through the pack horizontally is maximized.

Figure 6:
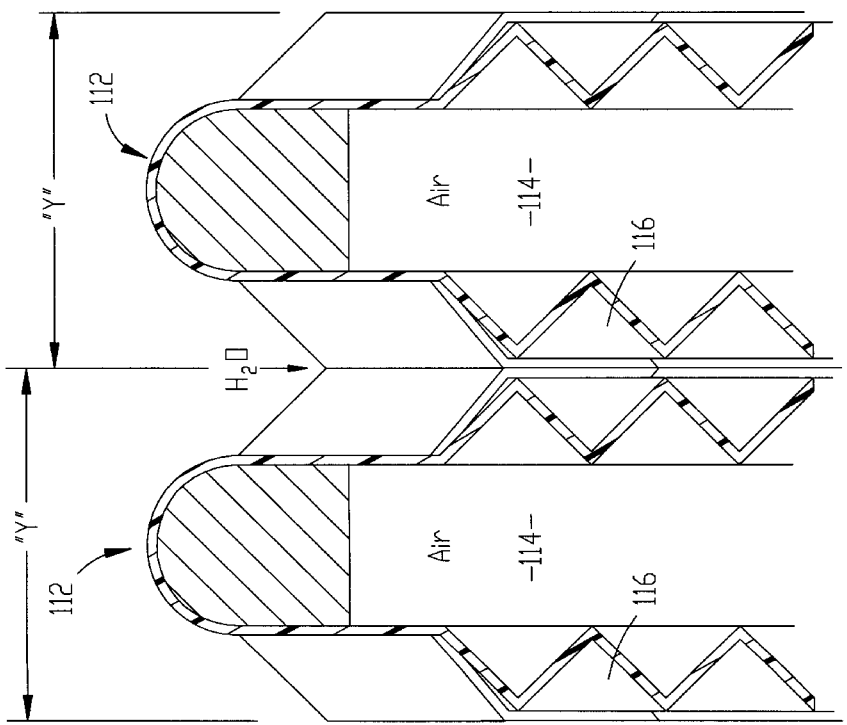
FIG. 6 is a fragmentary vertical sectional view of a prior art air-cooled heat exchanger as represented by the '689

In contrast, as shown in FIG. 6, the heat exchanger construction, as for example depicted in the '689 patent referenced above, employs members 112 presenting much larger air flow passages 114 than water flow passages 116. In an exemplary embodiment of the '689 patent heat exchanger, the water flow passages of each pack presented only about 30% of the pack volume while the air flow passages presented approximately 70% of the pack volume.

The unique diffuser 50 of the invention as illustrated in FIGS. 8–10 is preferably formed of a synthetic resin material such as acrylonitrile-butadiene-styrene (ABS) or the like. Referring to FIG. 9, the diffuser includes a bottom wall 118 that is surrounded by upstanding side walls 120 such that a chamber 122 is defined within which hot water can be distributed from the nozzles of the hot water distribution assembly. As shown in FIG. 8, the bottom wall is divided into three laterally extending, longitudinally spaced rows of troughs 124 that depend from the bottom wall. In FIG. 10 it can be seen that the troughs in each row are aligned with troughs in the other rows so that a line of three troughs are presented to each member 48 of the pack. As shown in FIG. 12, a slot 126 is formed in each trough prior to assembly in the heat exchanger such that the diffuser provides a means for delivering water from the chamber 122 to the interior spaces of the members of the pack.

The grooves 110 (FIG. 11) formed along the upper edges of the panels 64, 66 of each member protrude from the wet-transfer surfaces of the panels and engage the three troughs 124 disposed between the panels to substantially block air and water from migrating out of their respective passages. It is to be noted that the general complemental engagement of the troughs 124 with the underlying water entrance passages of respective member 48 serves to substantially prevent ingress of air into the liquid inlets at the upper end of each member 48. Although diffusers 50 as illustrated and described are provided in the preferred embodiment of the invention, such diffusers are not essential so long as equivalent means is provided for delivering water or liquid to be cooled into the open uppermost inlets of the tubular members while at the same time preventing undesirable ingress of significant quantities of air into respective tubular liquid passages. The construction of tubular members 48 facilitates side-by-side positioning thereof with the horizontal inlet openings at the top of each liquid passage of the members 48 in horizontally aligned, interengaging relationship. The proximal edges of the members 48 may be sealed if desired with an adhesive or by ultrasonic welding. Furthermore, the. construction and arrangement of tubular members 48 is such that gasket and upright wall seals may readily be provided across opposite upper ends of the pack of tubular members 48. This vertical wall resting on an appropriate gasket construction at each upper water inlet and upper air outlet edges of the pack can readily be located at the generally Y-shaped end extremities of each of the tubular members 48, as depicted in FIG. 5. The wall and gasket construction would extend across the entire side-to-side width of the pack at the front and rear thereof, thus excluding entrance of air into the liquid passages of tubular members 48. If desired, the troughs of the diffuser can be adhesively sealed to the members along the upper edges of the members to further block air from migrating into the water passages and water from migrating into the air passages. It is noteworthy that the grooves defining the chevron pattern of panels 64 serve to very quickly, evenly distribute liquid to be cooled across the entire width of each water passage. In the exchanger of the prior art '689 patent, the vertical stiffening ribs 40 of each panel were adhesively interconnected thus defining a series of individual tubular upright water passages. As a consequence, if uneven distribution of water occurred across the top of the exchanger pack thus causing water to channel in one tubular passage between adjacent ribs 40, the chevron pattern was not effective to redistribute the water across the entire width of the heat exchanger pack 20 as is the case with this invention.

FIG. 13 is a graphical representation illustrating a psychometric analysis of the plume abatement capabilities of an air-cooled heat exchanger constructed in accordance with the present invention as compared with the corresponding capabilities of two conventional finned tube heat exchanger constructions. The chart expresses the condition of the air passing through each of the heat exchanger constructions in terms of the humidity ratio, or grains of moisture per pound of dry air, there being 7,000 grains of moisture per pound of moisture. In addition, the chart expresses the temperature of the air as the dry bulb temperature, expressed in degrees Fahrenheit.

The curve 128 represents the temperature at which air is saturated with moisture and extends from the lower lefthand corner of the chart to the upper right-hand corner thereof. The capabilities of a first conventional air-cooled heat exchanger construction are shown as an irregular dashed line 130 terminating at a triangle and being spaced vertically above the saturation curve 128 along a substantial portion of the length thereof. The first conventional construction represents a finned tube design having a cost of about equal to that of the preferred embodiment of this invention.

The capabilities of a second conventional air-cooled heat exchanger construction are shown as a regular dashed line 132 terminating at a circle and being tangent with the saturation curve 128. The second conventional construction represents a finned tube design having a width twice that of the first conventional construction and a cost about twice that of the preferred embodiment of the invention.

As further illustrated in FIG. 13, an air-cooled heat exchanger construction in accordance with the preferred embodiment is shown as a solid line 134 in the chart, terminating at a square. The entire length of the line 134 is below the saturation curve 128. Thus, the chart of FIG. 13 illustrates the effectiveness of the preferred embodiment of the invention in abating or eliminating the development of fog or plumes during use of the heat exchanger. However, because the lines representative of the two conventional finned tube constructions contact or rise above the saturation curve, the air passing through those constructions reaches a super-saturated condition at which the moisture in the air condenses, forming visible, unwanted plumes. Operation of a tower in accordance with conditions as indicated by the line 130 of chart 13 would result in a substantial plume. Operation of the tower under conditions illustrated by line 132 of chart 13 wherein that operating condition line is tangent to saturation curve 128 would only theoretically result in complete plume abatement because perfect mixing of wet and dry air streams would be required. In actual practice, such perfect mixing of air and water cannot be attained and therefore there would be at least a partial plume emanating from the tower.

FIG. 14 is a graphical representation similar to FIG. 13, analyzing the plume abatement capabilities of an air-cooled heat exchanger constructed in accordance with the present invention as compared with the capabilities of two conventional air-cooled heat exchangers constructed in accordance with the '689 patent. The chart expresses the condition of the air passing through each of the heat exchanger constructions in terms of the humidity ratio, and the temperature of the air as the dry bulb temperature, expressed in degrees Fahrenheit.

The curve 128 in FIG. 14 again represents the temperature at which air is saturated and extends from the lower lefthand corner of the chart to the upper right-hand corner thereof. The capabilities of a first conventional air-cooled heat exchanger construction as represented by the construction of the '689 Cates patent are shown as an irregular dashed line 131 terminating at a triangle and being spaced vertically above the saturation curve 128 along a substantial portion of the length thereof. This first conventional construction includes a volume that is 1.5 times that of the preferred embodiment of this invention.

The capabilities of a second conventional air-cooled heat exchanger unit constructed in accordance with the '689 patent are shown as a regular dashed line 133 terminating at a circle and being in contact with the saturation curve 128 along a portion of the length thereof. The second conventional construction has a volume 3.75 times greater than that of the preferred embodiment of this invention.

As with FIG. 13, an air-cooled heat exchanger construction in accordance with the preferred embodiment is shown as a solid line 134 in FIG. 14, terminating at a square. The entire length of the line 134 is below the saturation curve 128, demonstrating again the improved plume abatement provided by the construction of the preferred embodiment. However, the improvement obtained through the use of the present invention goes beyond that which might be expected based on a comparison of the surface area presented by each of the constructions compared in the chart. The ratio of the surface area of the preferred construction to the surface area of the conventional construction shown in line 131 is 31.2/15=2.08. However, as the chart in FIG. 14 shows, even when the conventional construction is enlarged to 3.75 times the volume of the preferred construction, as shown by the line 133, it still underperforms the preferred embodiment for plume abatement, even though the ratio of the surface area of the preferred construction to the surface area of the enlarged conventional construction is 31.2/(3.75×15)=0.55. Further, the cost of the enlarged conventional construction is about 1.8 to 2.5 times greater than that of the preferred embodiment.

The unexpected improvement in the plume abatement capabilities of the preferred construction result at least partially from the reduced air pressure drop across the construction as compared with that across the conventional constructions. This lower pressure drop permits more air to pass through the air-cooled heat exchanger unit of the preferred embodiment, providing a two-fold advantage in cooling towers combining conventional fill units and air-cooled heat transfer units constructed in accordance with the preferred embodiment; less evaporative heat transfer is required which means less moisture is introduced into the wet section air stream of the cooling tower; and more dry heat is available from the dry air stream to abate the plume.

FIG. 15 is a graphical representation illustrating the water cooling capability of an air-cooled heat exchanger constructed in accordance with the present invention as compared with that of a conventional air-cooled heat exchanger construction of comparable cost at a hot water temperature of 120° F. Similarly, FIG. 16 is a graphical representation similar to FIG. 15, illustrating the water cooling capabilities of the air-cooled heat exchangers at a hot water temperature of 90° F. The left-hand margin of each graph represents the temperature of the water exiting the heat exchangers subsequent to cooling, expressed in degrees Fahrenheit. The bottom margin of each graph represents the dry bulb temperature of the ambient air used to cool the water, expressed in degrees Fahrenheit.

The lower line 136 in each graph represents the results achieved by the heat exchanger constructed in accordance with the preferred embodiment of the invention while the upper line 138 in each graph represents the results achieved by a conventional metal finned tube construction of comparable cost. As can be seen from a review of the graphs, the heat exchanger constructed in accordance with the preferred embodiment hereby provides greater cooling of the water than the referenced conventional construction of comparable cost. Accordingly, a designer of a water cooling tower has more options when employing the inventive construction and can either add more heat exchanger units for the same cost as a conventional finned tube design in order to obtain improved results, or achieve the same performance at a reduced cost.

As discussed above, FIG. 17 is a schematic representation of a mechanical draft crossflow cooling tower employing separate air-cooled heat exchangers in combination with conventional evaporative fill units similar to that shown in FIG. 1. However, other combinations can be employed in various applications to maximize the efficiency of the air-cooled heat exchangers and evaporative fill units for the given application. For example, FIG. 18 is a schematic representation of a mechanical draft cooling tower employing separate air-cooled crossflow heat exchanger units 32 in combination with conventional crossflow evaporative fill units 140, wherein the air-cooled heat exchanger units 32 are located above and outside of the fill units 140, 142, and some of the fill units 142 are used to cool water that is discharged from the air-cooled units 32. Such a construction facilitates the use of the fill units 140 independently of the air-cooled units to accommodate varying cooling loads and requirements.

FIG. 19 is a schematic representation of a mechanical draft crossflow cooling tower employing separate air-cooled heat exchanger units 32 positioned atop conventional evaporative fill units 144. Thus, water discharged from the air-cooled units 32 is fed directly into the fill units 144, eliminating the need for additional distribution lines between the air-cooled units and the fill units. FIG. 20 is a schematic representation of another mechanical draft crossflow cooling tower employing separate air-cooled heat exchanger units 32 positioned above conventional, angled evaporative fill units 146.

FIG. 21 is a schematic representation of a mechanical draft crossflow cooling tower employing a separate air-cooled heat exchanger unit 32 on one side thereof and a conventional, angled evaporative fill unit 146 on the other side thereof. By providing this construction, the units may be used either simultaneously or independently in order to handle varying cooling requirements under differing ambient conditions.

FIG. 22 is a fragmentary schematic representation of a mechanical draft crossflow cooling tower as shown in FIG. 20, illustrating outer air dampers 148 provided at the inlet side of the upper and/or lower heat exchanger units. Optional inner air dampers can be provided at the outlet side of the upper and lower heat exchanger units, as shown by the phantom lines 150. Such dampers permit additional control over the flow of air through the units to improve operation of the units under varying ambient conditions and water loads.

The mechanical draft plume abatement water cooling tower illustrated in FIG. 23 and designated by the numeral 200 has two opposed upper, air-cooled heat exchanger units 232, lower, conventional, counter-flow evaporative wet fill units 234, and air stream mixing baffle structure generally designated as 250. The structure 250 may advantageously take the form of a plurality of individual baffles 252 which extend into the plenum area 230 above wet fill units 234. As is apparent from FIG. 23, three baffles 252 may serve the required purpose of effecting an intimate mixing of the moist and dry air within plenum 230 for ultimate discharge through stack 228, with one baffle 252a extending from the heat exchanger unit 232a to the central part of plenum 230, while opposed baffles 252b project from heat exchanger unit 232b toward the center of the plenum 230. It is notable from FIG. 23 that baffle 252a is aligned with the space between baffles 252b.

Although three baffles as represented by 252a and 252b may in certain instances be adequate for mixing the moist and dry air in the plenum of a small single cell cooling tower, it is to be understood that the number and relative orientation of the baffles may be changed as desirable or necessary to assure adequate intermixing of the moist and dry air. The cooling tower depicted in FIG. 23 is intended to be representative only and illustrative of baffling which may be used if required to enhance mixing of the moist and dry air streams emanating from the heat exchanger units 232 and wet fill units 234 respectively within plenum 230.

The baffles 252 are provided to promote blending of the respective moist and dry air masses into a common, more homogenous air mass before being discharged into the atmosphere through the upper end of stack 228. Wet air, if not sufficiently mixed with dry air before being discharged, may form visible vapor until it mixes sufficiently into the atmosphere. As an example of an application where plume abatement is critical, water cooling towers adjacent the runways of an airport require that no plume be emitted from the tower which would interfere with runway visibility under varying ambient weather conditions. Less critical applications may not require mixing baffles 252 provided that some modest amount of visible plume is acceptable.

If baffles 252 are omitted from the wet-dry cooling tower, air streams exiting from the air-cooled heat exchangers 232 and lower wet fill units 234 have a natural propensity to follow segregated paths as a consequence of their geometric orientations. Air streams from the air-cooled units 232 tend to follow a direct path to the nearest respective lower edges of stack 228. Surprisingly little air stream mixing occurs at fan 226. Baffles 252 serve to interrupt air streams exiting from lower fill units 234 and allow penetration of the dry air streams from the upper air-cooled units 232 into the central part of plenum 230. It is to be understood in this respect that although not specifically depicted in schematic drawings FIGS. 18 and 20–22, mixing baffles such as structure 250 may be employed in such constructions if necessary or desirable to assure adequate mixing of the moist and dry air streams in the plenum of the tower.

It has been determined that the dry-air-surface heat exchangers 32 of this invention should be constructed to conform to a number of critical parameters. Viewing FIG. 7, the maximum cross-sectional width of each of the members 48, i.e., the distance from a vertical plane through the outermost faces of the protrusions 80 extending outwardly from one main corrugated surface of each member 48 to a vertical plane through the outermost faces of the protrusions 80 projecting outwardly from the other main corrugated surface of each member 48 (the distance designated "X" in FIG. 7) should be from about 1 inch to about 1.5 inches, desirably from about 1.1 inches to about 1.3 inches, and preferably about 1.2 inches. Accordingly, from about 8 to 12 of the members 48 should be provided per horizontal lineal foot of the pack of members making up a respective dry-air-surface heat exchanger 32, desirably about 9 to 11 members 48 per horizontal lineal foot of the heat exchanger pack, and preferably about 10 members 48 per horizontal lineal foot.

The ratio of the total vertical, cross-sectional area of the liquid passages through the members 48 making up a pack of a respective heat exchanger unit 32 with respect to the total vertical, cross-sectional area of the air passages between members 48 of that pack should be from about 0.67 to about 1.5. Stated another way, the center-to-center spacing between the panels of each tubular heat transfer member, i.e., a value equal to the center of each liquid passage to the center of an adjacent liquid passage (dimension "X" in FIG. 7), is from about 1 to about 1.5 in. Similarly, on this basis, the ratio of the liquid space volume of the liquid passages with respect to the total volume of the combination of the air passages and the liquid passages being from about 0.35 to about 0.6. Thus, the air passage to water passage volume ratios should be from about 40% air passages to about 60% water passages, desirably from about 50% air passages to about 50% water passages, and preferably about 60% air passages to about 40% water passages.

In addition, the depth of the grooves making up the serpentine, chevron pattern 78 of the main panel sections of members 48 (measured transverse to a plane of an unformed sheet) should range from about 0.1 to about 0.4, most desirably from about 0.19 inch to about 0.325 inch, and preferably be about 0.26 inch. The vertical height of each of the V-shaped grooves 78 which alternately face toward opposite side margins of each member 48, i.e., the maximum distance between each wall segment of a V-shaped groove away from the apex thereof, should be from about 1.2 inches to about 2 inches and preferably about 1.8 inches. The included angle of each V-shaped groove should be from about 40° to about 70° and preferably about 60° horizontal angles.

In the construction of the '689 Cates patent, the spacing of the members as represented by the distance "Y" of FIG. 6, is 2.5 inches representing 4.8 of the dry surface members per horizontal lineal foot of the heat exchanger pack. Thus, the ratio of the dry surface heat exchanger area of this invention is over twice as much as the surface area of the dry surface heat exchanger of the '689 patent. Consequently, in order to obtain heat exchange performance from the structure of the '689 patent equivalent to that of the present invention, the cost of such construction would be from about 1.8 to about 2.5 times more costly.

Superior heat transfer capability is an important advantage of the present invention over the tower of the Cates patent and conventional finned coil-type construction. With finned coil wet-dry cooling towers configured for plume abatement, it is the usual practice to direct all of the water to be cooled in serial order through the finned coil dry heat exchange section and the evaporative heat exchange section, with a single pumping stage being employed to elevate the hot water to be cooled to the upper end of the overlying finned coil dry exchange section. A substantial part of the extra energy consumed in pumping the entire volume of hot water to be cooled to the top of the dry fin coil section of the tower can be recovered in certain instances by taking advantageous of the syphon loop that is created in the closed dry section circuit. In a wet-dry plume abatement tower of the proposed Cates design, the dry heat exchange section would be so inefficient that 100% of the hot water to be cooled also would have to be pumped through the dry section before being distributed over the wet heat exchange section. Again, the entire volume of hot water to be cooled would have to be pumped to the upper end of the cooling tower at the top of the dry heat exchange section. However, in this instance, none of the additional pump head energy required to pump all of the hot water to the top of the dry exchange section could be recovered because the upper end of the dry section of Cates is vented into the atmosphere and there is no suction loop created.

In the present invention, it has been determined that only about 25% to about 50% of the total hot water supply to the tower is required to be first directed to the dry heat exchanger section 32. That proportion of the hot water supply is adequate to provide plume abatement under most ambient design conditions likely to be encountered by the plume abatement configuration of this invention. Thus, a significantly smaller proportion of the total hot water flow over the tower is required to be distributed to the dry heat exchanger units 32 of the present invention than would have been required with the Cates design or with fin coils. Minimization of the proportion of hot water of the total flow over the tower that is required to be directed to a dry section in order to obtain plume abatement under all atmospheric conditions that the tower is potentially to be exposed, has significant economic benefits. First, the piping and associated accessories necessary to supply hot water to the dry heat exchanger section may be smaller and thus less costly. Second, this invention allows a design election to be made, i.e., to use separate pumps to supply hot water to be cooled to the dry heat exchanger units 32 and to the evaporative heat exchanger units 34, thus significantly limiting the amount of water that must be pumped to the dry heat exchanger relative to the total water flow to the tower. In view of the fact that the dry heat exchanger units 32 are at a substantially higher elevation than the evaporative heat exchanger units 34, the less hot water that must be pumped to that higher elevation the better, not only from the standpoint of size of pump requirements, but also because of higher operating costs for a larger pump. Pump heads are often energy evaluated on large cooling tower installations for economic comparisons of alternative designs by as much as $100,000 per foot of head, or more. For a design delivering 25% of the flow to the upper dry heat exchanger units 32 by an additional 15 feet above that necessary for delivery of hot water to be cooled to the lower wet heat exchanger units, the energy evaluation for the present invention would be favorable by a factor of (1−0.25)×15 ft.×$100,000/ft.=$1,125,000, which can largely be saved by using separate pumps for delivering water to the dry heat exchanger section 32 and to the wet evaporative section 34 respectively.

Although the present invention has been described with reference to the preferred embodiment, it is noted that equivalents may be employed and substitution made herein without departing from the scope of the invention as recited in the claims. For example, fluids other than water may be cooled. Illustrative in this respect are glycol solutions or brine solutions. Generally speaking, the temperature of the fluid to be cooled should not exceed about 180° F. in instances where the members 48 are fabricated of a synthetic resin such as polyvinyl chloride or the like.

What is claimed is:

1. An assembly for use as a part of an atmospheric cooling tower for cooling initially hot liquid with currents of ambient air, said assembly comprising:

a heat exchange pack including a plurality of preformed, tubular heat transfer members, each of said members having a pair of upright, side-by-side panels of synthetic resin sheet material and provided with opposed, interengaging upright front and rear edges, spaced, generally horizontally extending upper liquid entry edges defining a liquid inlet therebetween, spaced, generally horizontally extending lower liquid exit edges defining a liquid outlet therebetween, and main panel sections having opposed surfaces defining a pattern for zig-zag flow of water thereover, said opposed surfaces being in horizontally spaced relationship a distance greater than twice the thickness of the sheet material and defining a liquid passage therebetween, said heat transfer members located in juxtaposed relationship and presenting air passages therebetween for receiving said ambient air currents, the center-to-center spacing between adjacent heat transfer members being from about 1 to about 1.5 inches, the ratio of the liquid space volume of the liquid passages to the total volume of the combination of the air passages and the liquid passages being from about 0.35 to about 0.6, a hot liquid distribution assembly located above said heat exchange pack and having a plurality of hot liquid delivery outlets for delivery of hot liquid to the heat exchange pack for gravitational flow therethrough, the assembly having wall structure cooperating with said delivery outlets to substantially prevent ingress of significant air into said liquid passages with the hot liquid; and a cooled liquid collector disposed below said heat exchange pack and in communication with said liquid outlets.

2. An assembly as recited in claim 1 wherein each of said transfer members comprises a formed synthetic resin sheet which has been folded along a line to present said opposed side-by-side panels with the front entry edges thereof being integrally interconnected.

3. An assembly as recited in claim 1, further comprising:

a series of spacers for maintaining a space between the wet-transfer surfaces of the panels, said spacers including a plurality of preformed, shape-retaining spacer elements protruding toward one another from the wet-transfer surface of each panel section, said spacer elements being positioned on each panel section in disposition to engage and directly oppose a corresponding spacer element on the facing panel section to prevent the panel sections from coming together during use of the heat exchanger.

4. An assembly as recited in claim 1, wherein said plurality of the heat transfer members are provided in a pack and the front and rear edges of each member are secured together in substantially fluid tight sealing engagement, said heat exchanger further comprising:

support structure for supporting the heat transfer members in side-by-side relationship with the panel sections of the heat transfer members oriented parallel to one another; and a series of spacers for maintaining a space between the wet-transfer surfaces of the panels of each heat transfer member to prevent the panel sections of each panel from coming together during use, said hot liquid distribution assembly including at least one diffuser extending into the liquid inlet of each of the panels for directing the hot liquid into the liquid passage between the panel sections of each heat transfer member, the diffuser seating against the upper edges of the panels to block air from migrating from the air passages to the liquid passages and for blocking liquid from migrating from the liquid passages to the air passages.

5. An assembly as recited in claim 4, wherein the support includes at least one support member extending horizontally through the heat transfer members, the panel sections of each member including an opening for receiving the support member, said panel sections each having a tubular margin surrounding a respective opening therein, the tubular margins of the panel sections of each transfer member being aligned and shaped for nesting engagement with one another, and means for sealing the nested tubular margins of each panel to substantially block any leakage of liquid and air between the panels of each heat transfer member.

6. An assembly as recited in claim 1, further comprising an interspacing means for maintaining a space between the panel sections of each heat transfer member and the panel sections of adjacent heat transfer members.

7. An assembly as recited in claim 6, wherein
the interspacing means includes first and second preformed, shape-retaining, elongated spacers formed in each of the members, the first spacer protruding from the wet-transfer surface of one of the panel sections of each heat transfer member, and the second spacer protruding from the dry-transfer surface of the other panel section of each heat transfer member,
each of the first spacers having a longitudinal axis extending essentially perpendicular to the upper and lower edges of a respective heat transfer member within the flow path of liquid through corresponding liquid passages between the panel sections of each panel, and each of the second spacers having a longitudinal axis extending essentially parallel to the upper and lower edges corresponding heat transfer members within the path of currents of air passing between adjacent heat transfer members, the first and second spacers of each heat transfer member nesting
against one another to maintain spacing between the panel sections of the heat transfer members and being configured to nest against the spacers of adjacent heat transfer members to maintain the spacing between adjacent heat transfer members.

8. An assembly as recited in claim 1 wherein the plurality of heat transfer members define a pack, there being from about 8 to about 12 heat transfer members for each linear foot across the width of the pack in a direction essentially perpendicular to currents of air therethrough.

9. An assembly as recited in claim 8 wherein about 9 to 11 of said heat transfer members are provided for each linear foot across the width of the pack.

10. An assembly as recited in claim 8 wherein about 10 of said heat transfer members are provided for each linear foot across the width of the pack.

11. An assembly as recited in claim 1 wherein the transverse, horizontal space occupied by each of said members is from about 1 inch to about 1.5 inches.

12. An assembly as recited in claim 1 wherein the transverse, horizontal space occupied by each of said members is from about 1.1 inches to about 1.3 inches.

13. An assembly as recited in claim 1 wherein the transverse, horizontal space occupied by each of said members is about 1.2 inches.

14. An assembly as recited in claim 1 wherein said main panel sections of each of the heat transfer members have serpentine grooves therein defining serpentine liquid flow paths extending generally from the liquid inlet to the liquid outlets thereof, said serpentine grooves being defined by alternating valleys and peaks in the surfaces of the main panel sections, each of said grooves having a depth of from about 0.19 inch to 0.325 inch.

15. An assembly as recited in claim 14 wherein said grooves have a depth of about 0.258 inch.

16. An assembly as recited in claim 14 wherein the serpentine grooves are defined by V-shaped segments that in the plane of a respective panel section alternately open toward the front and rear edges of each of the heat transfer members, the maximum vertical height of each V-shaped segment being from about 1.2 inches to about 2.0 inches.

17. An assembly as recited in claim 16 wherein the maximum vertical height of each V-shaped segment is about 1.8 inches.

18. An assembly as recited in claim 16 wherein the included angle of each V-shaped groove segment is within the range of about 40° to about 70°.

19. An assembly as recited in claim 16 wherein the included angle of each V-shaped groove segment is within the range of about 60°.

20. An assembly as recited in claim 1 wherein said tortuous wet heat transfer surfaces are defined by grooves presenting alternate peaks and valleys, the depth of each of the valleys being from about 0.1 to about 0.4 in.

21. An assembly as recited in claim 20 wherein said tortuous wet heat transfer surfaces are defined by grooves presenting alternate peaks and valleys, the depth of each of the valleys being about 0.26 in.

22. An assembly as recited in claim 20 wherein said grooves are generally V-shaped and defined by alternate converging and diverging wall segments with the maximum distance between diverging segments of each V-shaped groove remote from the apex thereof being from about 1.2 to 2 in.

23. An assembly as recited in claim 22 wherein said grooves are generally V-shaped and defined by alternate converging and diverging wall segments with the maximum distance between diverging segments of each V-shaped groove remote from the apex thereof being about 1.8 in.

24. An assembly as recited in claim 22 wherein the angle between said diverging wall segments of each of said V-shaped grooves is from about 40° to about 70°.

25. An assembly as recited in claim 22 wherein the angle between said diverging wall segments of each of said V-shaped grooves is about 60°.

26. An assembly for use as a part of an atmospheric cooling tower for cooling a liquid with air currents, said assembly including:
a supply of hot liquid to be cooled;
hot liquid distribution means for receiving hot liquid to be cooled from the hot liquid supply and operable to deliver hot liquid at generally ambient air pressure conditions to an area below the distribution means;
a heat exchange pack in said area underlying the hot water distribution means and having a plurality of discrete preformed, tubular shape-retaining heat transfer members of relatively thin synthetic resin sheet material,
each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges,
said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the center-to-center spacing between said panels of each tubular heat transfer member being from about 1 to about 1.5 in., and the ratio of the liquid space volume of the liquid passages with respect to the total volume of the combination of the air passages and the liquid passages being from about 0.35 to about 0.6;

a plurality of preformed, shape-retaining, elongated inlet spacers formed in each of the heat transfer members and protruding from the dry-transfer surfaces thereof along the front edges of each heat transfer member, each of the inlet spacers being tear-drop shaped, defining a longitudinal axis that extends in a direction parallel to the upper and lower edges of respective heat transfer members, with the wider extent of each tear-drop shaped inlet spacer facing the air currents directed into the air passages, means for delivering liquid to be cooled into respective heat transfer members through the liquid inlets thereof for gravitational flow of liquid downwardly through the heat transfer members while substantially preventing ingress of air into the liquid inlets to said liquid passages;

means for collecting cooled liquid delivered from the liquid outlets of said heat transfer members; and means for directing currents of cooling air through the air passages between the heat transfer members.

27. An assembly for use as a part of an atmospheric cooling tower for cooling a liquid with currents of air, said assembly including:

a supply of hot liquid to be cooled;

hot liquid distribution means for receiving hot liquid to be cooled from the hot liquid supply and operable to deliver hot liquid at generally ambient air pressure conditions to an area below the distribution means;

a heat exchange pack in said area underlying the hot water distribution means and having a plurality of discrete preformed, tubular shape-retaining heat transfer members of relatively thin synthetic resin sheet material, each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges, said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the center-to-center spacing between said panels of each tubular heat transfer member being from about 1 to about 1.5 in., and the ratio of the liquid space volume of the liquid passages with respect to the total volume of the combination of the air passages and the liquid passages being from about 0.35 to about 0.6;

a plurality of preformed, shape-retaining, elongated outlet spacers formed in each of the members and protruding from the dry-transfer surface along the rear edges of respective heat transfer members, each of the outlet spacers being generally oval in shape and defining a longitudinal axis that extends in a direction at an angle to the upper and lower edges of corresponding heat transfer members;

means for delivering liquid to be cooled into respective heat transfer members through the liquid inlets thereof for gravitational flow of liquid downwardly through the heat transfer members while substantially preventing ingress of air into the liquid inlets to said liquid passages;

means for collecting cooled liquid delivered from the liquid outlets of said heat transfer members; and means for directing currents of cooling air through the air passages between the heat transfer members.

28. A dry-air-surface heat exchanger as recited in claim 27 wherein the outlet spacers are located in disposition wherein the longitudinal axes thereof are tilted upwardly.

29. An assembly for use as a part of an atmospheric cooling tower for cooling a liquid with currents of air, said assembly including:

a supply of hot liquid to be cooled;

hot liquid distribution means for receiving hot liquid to be cooled from the hot liquid supply and operable to deliver hot liquid at generally ambient air pressure conditions to an area below the distribution means;

a heat exchange pack in said area underlying the hot water distribution means and having a plurality of discrete preformed, tubular shape-retaining heat transfer members of relatively thin synthetic resin sheet material, each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges, said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the center-to-center spacing between said panels of each tubular heat transfer member being from about 1 to about 1.5 in., and the ratio of the liquid space volume of the liquid passages with respect to the total volume of the combination of the air passages and the liquid passages being from about 0.35 to about 0.6;

means for delivering liquid to be cooled into respective heat transfer members through the liquid inlets thereof for gravitational flow of liquid downwardly through the heat transfer members while substantially preventing ingress of air into the liquid inlets to said liquid passages;

said means for delivering liquid to be cooled into respective heat transfer members including a diffuser basin having a bottom wall and side walls which cooperate to define a chamber for liquid to be cooled, and a series of elongated, generally parallel troughs integrally joined to the bottom wall of the diffuser communicating with the chamber and each having a slot in the lower extremity thereof, said troughs being substantially complementally received within the liquid inlets of respective heat transfer members;

each of said troughs generally sealingly engaging the upper liquid entry edges of a respective heat transfer member to substantially prevent egress of liquid from the liquid passages of the heat transfer members through a corresponding liquid inlet, and substantially prevent ingress of air into the liquid inlets to said liquid passages of the heat exchange members;

means for collecting cooled liquid delivered from the liquid outlets of said heat transfer members; and means for directing currents of cooling air through the air passages between the heat transfer members.

30. A wet-dry atmospheric cooling tower for cooling a liquid with currents of air without the formation of a significant visible plume, said cooling tower comprising:

a supply of hot liquid to be cooled;

hot liquid distribution means for receiving hot liquid to be cooled from the liquid supply;

a wet heat exchange section for subjecting the hot liquid to be cooled to direct currents of ambient derived air to effect cooling of the hot liquid by evaporative heat exchange, said wet heat exchange section being located to receive hot liquid from the hot liquid distribution means for gravitational flow of the hot liquid through the wet heat exchange section;

means for collecting cooled liquid at generally ambient air pressure conditions and which is delivered from the lower end of the wet heat exchange section;

a dry surface heat exchange pack underlying the hot liquid distribution means and having a plurality of discrete, preformed, tubular, shape-retaining heat transfer members of relatively thin synthetic resin sheet material, each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges, said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the center-to-center spacing between said panels of each tubular heat transfer member being from about 1 to about 1.5 in., and the ratio of the liquid space volume of the liquid passages with respect to the total volume of the combination of the air passages and the liquid passages being from about 0.35 to about 0.6, said hot liquid distribution means being operable to deliver liquid to be cooled into respective heat transfer members through the liquid inlets thereof for gravitational flow of liquid downwardly through the heat transfer members while substantially preventing ingress of air into the liquid inlets to said liquid passages;

means for collecting cooled liquid at generally ambient air pressure conditions and which is delivered from the liquid outlets of said heat transfer members of the heat exchange pack; and means for directing currents of cooling air through hot liquid gravitating downwardly in the wet heat exchange section and through the air passages between the heat transfer members.

31. A wet-dry atmospheric cooling tower as recited in claim 30, wherein the wet heat exchange section is of a size substantially greater than the size of the dry surface heat exchange pack to permit accommodation of a greater quantity of hot liquid being directed to the wet heat exchange section than is directed to the dry surface heat exchange pack.

32. A wet-dry atmospheric cooling tower as recited in claim 31, wherein said wet heat exchange section and the dry surface heat exchange pack are respectively sized to permit at least about three-fourths of the hot liquid to be delivered to the wet heat exchange section and to permit the remaining about one-fourth of the hot liquid to be delivered to the dry surface heat exchange pack.

33. A wet-dry atmospheric cooling tower as recited in claim 31, wherein said dry surface heat exchange pack is positioned above the wet heat exchange section, there being means for collecting and combining cooled liquid delivered from the lower ends of the dry surface heat exchange pack and the wet heat exchange section.

34. A dry-air-surface heat exchanger for cooling of a liquid with air currents, comprising:

a plurality of discrete, preformed, tubular shape-retaining heat transfer members of relatively thin synthetic resin sheet material, each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges, said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the total vertical, cross-sectional area of the liquid passages through said members with respect to the total vertical, cross-sectional area of the air passages between said members being a ratio of from about 0.67 to about 1.5, there being a plurality of preformed, shape-retaining, elongated inlet spacers formed in each of the heat transfer members and protruding from the dry-transfer surfaces thereof along the front edges of each heat transfer member, each of the inlet spacers being teardrop shaped, defining a longitudinal axis that extends in a direction parallel to the upper and lower edges of respective heat transfer members, with the wider extent of each tear-drop shaped inlet spacer facing the air currents directed into the air passages, means for delivering liquid to be cooled into respective heat transfer members through the liquid inlets thereof while substantially preventing ingress of air into the liquid inlets to said liquid passages;

means for collecting cooled liquid delivered from the liquid outlets of said heat transfer members; and means for directing currents of cooling air through the air passages between the heat transfer members.

35. A dry-air-surface heat exchanger for cooling of a liquid with air currents, comprising:

a plurality of discrete, preformed, tubular shape-retaining heat transfer members of relatively thin synthetic resin sheet material, each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges, said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the total vertical, cross-sectional area of the liquid passages through said members with respect to the total vertical, cross-sectional area of the air passages between said members being a ratio of from about 0.67 to about 1.5, there being a plurality of preformed, shape-retaining, elongated outlet spacers formed in each of the members and protruding from the dry-transfer surface along the rear edges of respective heat transfer members, each of the outlet spacers being generally oval in shape and defining a longitudinal axis that extends in a direction at an angle to the upper and lower edges of corresponding heat transfer members;

means for delivering liquid to be cooled into respective heat transfer members through the liquid inlets thereof while substantially preventing ingress of air into the liquid inlets to said liquid passages;

means for collecting cooled liquid delivered from the liquid outlets of said heat transfer members; and means for directing currents of cooling air through the air passages between the heat transfer members.

36. A dry-air-surface heat exchanger as recited in claim 25 wherein the outlet spacers are located in disposition wherein the longitudinal axes thereof are tilted upwardly.

37. A dry-air-surface heat exchanger for cooling of a liquid with air currents, comprising:

a plurality of discrete, preformed, tubular shape-retaining heat transfer members of relatively thin synthetic resin sheet material, each of said members having two upright, side-by-side panels provided with opposed, interengaging, upright front and rear edges, spaced, generally horizontally extending upper liquid entry edges defining an elongated liquid inlet therebetween, spaced, generally horizontally extending lower liquid exit edges defining an elongated liquid outlet therebetween, and main panel sections in horizontally spaced relationship defining a liquid passage therebetween and provided with facing wet heat transfer surfaces configured to present a series of tortuous liquid flow paths extending between the upper liquid entry and lower liquid exit edges, said front and rear edges of the main panel sections of each member being in sufficient interengagement to prevent significant outflow of liquid from the liquid passages between corresponding opposed panel sections, said heat transfer members being located in spaced, side-by-side relationship presenting air passages between each adjacent pair of members with the liquid inlets of the members in proximal, side-by-side relationship, the total vertical, cross-sectional area of the liquid passages through said members with respect to the total vertical, cross-sectional area of the air passages between said members being a ratio of from about 0.67 to about 1.5, means for delivering liquid to be cooled into respective heat transfer members through the liquid inlets thereof while substantially preventing ingress of air into the liquid inlets to said liquid passages;

means for collecting cooled liquid delivered from the liquid outlets of said heat transfer members, said means for delivering liquid to be cooled into respective heat transfer members includes a diffuser basin having a bottom wall and side walls which cooperate to define a chamber for liquid to be cooled, and a series of elongated, generally parallel troughs integrally joined to the bottom wall of the diffuser communicating with the chamber and each having a slot in the lower extremity thereof, said troughs being substantially complementally received within the liquid inlets of respective heat transfer members, said troughs generally sealingly engages the upper liquid entry edges of a respective heat transfer member to substantially prevent egress of liquid from the liquid passages of the heat transfer members through a corresponding liquid inlet, and substantially prevent ingress of air into the liquid inlets to said liquid passages of the heat exchange members; and means for directing currents of cooling air through the air passages between the heat transfer members.

38. A heat exchange pack comprising:

a plurality of preformed, tubular heat transfer members, each of said members having a pair of upright, side-by-side panels of synthetic resin sheet material and provided with opposed, interengaging upright front and rear edges, spaced, generally horizontally extending upper liquid entry edges defining a liquid inlet therebetween, spaced, generally horizontally extending lower liquid exit edges defining a liquid outlet therebetween, and main panel sections having opposed surfaces defining a pattern for zig-zag flow of water thereover, said opposed surfaces being in horizontally spaced relationship a distance greater than twice the thickness of the sheet material and defining a liquid passage therebetween, said heat transfer members located in juxtaposed relationship and presenting air passages therebetween for receiving said ambient air currents, the center-to-center spacing between adjacent heat transfer members being from about 1 to about 1.5 inches, and the ratio of the liquid space volume of the liquid passages to the total volume of the combination of the air passages and the liquid passages being from about 0.35 to about 0.6.

39. A heat exchange pack as set forth in claim 38 wherein the total vertical, cross-sectional area of the liquid passages through said members with respect to the total vertical, cross-sectional area of the air passages between said members being a ratio of from about 0.67 to about 1.5.

* * * * *